US009067137B2

(12) United States Patent
Ogasawara et al.

(10) Patent No.: US 9,067,137 B2
(45) Date of Patent: Jun. 30, 2015

(54) COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(75) Inventors: Hiroyuki Ogasawara, Chiyoda-ku (JP); Katsunori Orimoto, Chiyoda-ku (JP)

(73) Assignees: NINTENDO CO., LTD., Kyoto (JP); CREATURES INC., Tokyo (JP)

( * ) Notice: Subject to any disclaimer, the term of this patent is extended or adjusted under 35 U.S.C. 154(b) by 947 days.

(21) Appl. No.: 13/177,854

(22) Filed: Jul. 7, 2011

(65) Prior Publication Data
US 2012/0256961 A1  Oct. 11, 2012

(30) Foreign Application Priority Data
Apr. 8, 2011  (JP) ................................. 2011-086798

(51) Int. Cl.
G06T 3/60 (2006.01)
A63F 13/20 (2014.01)

(52) U.S. Cl.
CPC ........... *A63F 13/06* (2013.01); *A63F 2300/105* (2013.01); *A63F 2300/1087* (2013.01); *A63F 2300/204* (2013.01); *A63F 2300/6045* (2013.01); *A63F 2300/6676* (2013.01)

(58) Field of Classification Search
CPC ....................................................... G06T 15/08
See application file for complete search history.

(56) References Cited

U.S. PATENT DOCUMENTS

| 2007/0139322 | A1 | 6/2007 | Takemoto et al. | |
|---|---|---|---|---|
| 2008/0100620 | A1* | 5/2008 | Nagai et al. | 345/424 |
| 2008/0285854 | A1 | 11/2008 | Kotake et al. | |
| 2009/0017907 | A1 | 1/2009 | Shimizu | |
| 2009/0298596 | A1* | 12/2009 | Huang et al. | 463/43 |
| 2010/0073367 | A1* | 3/2010 | Aonuma et al. | 345/419 |
| 2010/0277489 | A1* | 11/2010 | Geisner et al. | 345/581 |
| 2011/0304632 | A1* | 12/2011 | Evertt et al. | 345/474 |

FOREIGN PATENT DOCUMENTS

| JP | 2006-72667 | 3/2006 |
|---|---|---|
| JP | 2007166427 | 6/2007 |
| JP | 200865807 | 3/2008 |
| JP | 200915793 | 1/2009 |
| JP | 2010170316 | 8/2010 |

OTHER PUBLICATIONS

Abstract and English-language machine translation of JP 2010-170316 (19 pages).

* cited by examiner

Primary Examiner — Ke Xiao
Assistant Examiner — Kim-Thanh T Tran
(74) Attorney, Agent, or Firm — Nixon & Vanderhye P.C.

(57) ABSTRACT

A game apparatus takes an image of a marker placed in the real space. The game apparatus calculates the position and the orientation of the marker with respect to the game apparatus on the basis of the marker included in the taken image, and sets a marker coordinate system on the marker. In addition, the game apparatus detects the direction of gravity on the basis of acceleration detected by an acceleration sensor included in the game apparatus. Next, the game apparatus calculates the direction of gravity in the marker coordinate system on the basis of the detected direction of gravity, and determines the orientation of the virtual character on the basis of the calculated direction of gravity in the marker coordinate system. Then, the game apparatus displays the virtual character on a display device.

23 Claims, 19 Drawing Sheets

F I G. 4
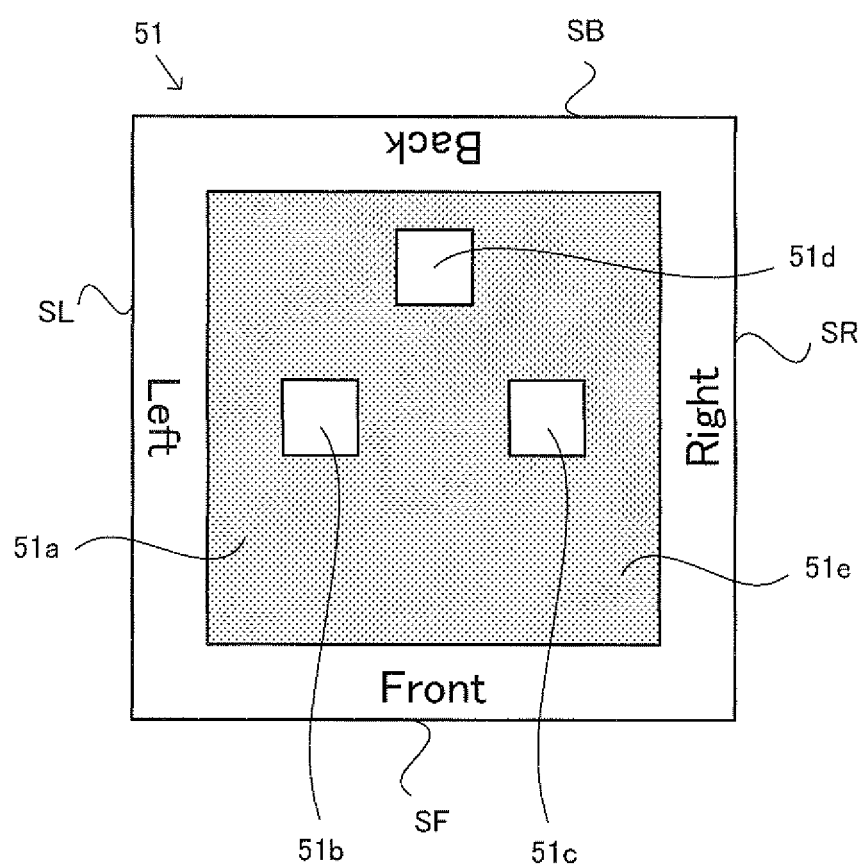

F I G. 1 3
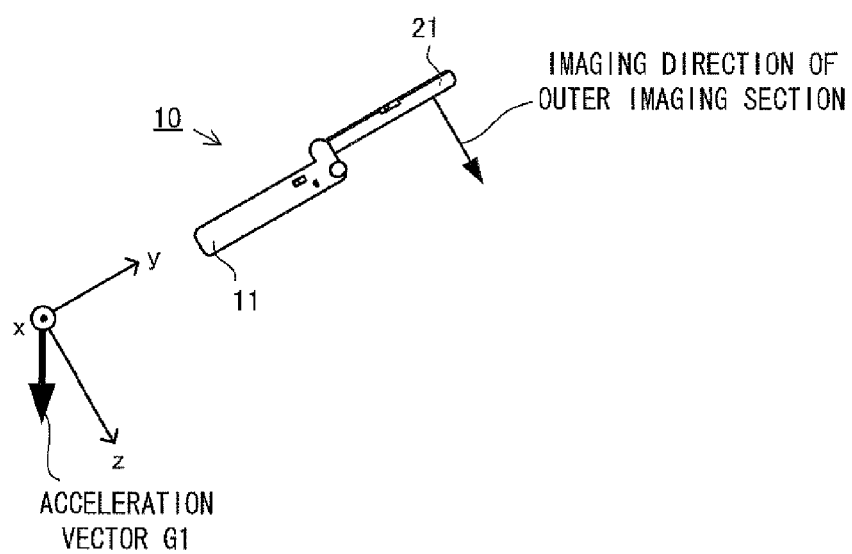
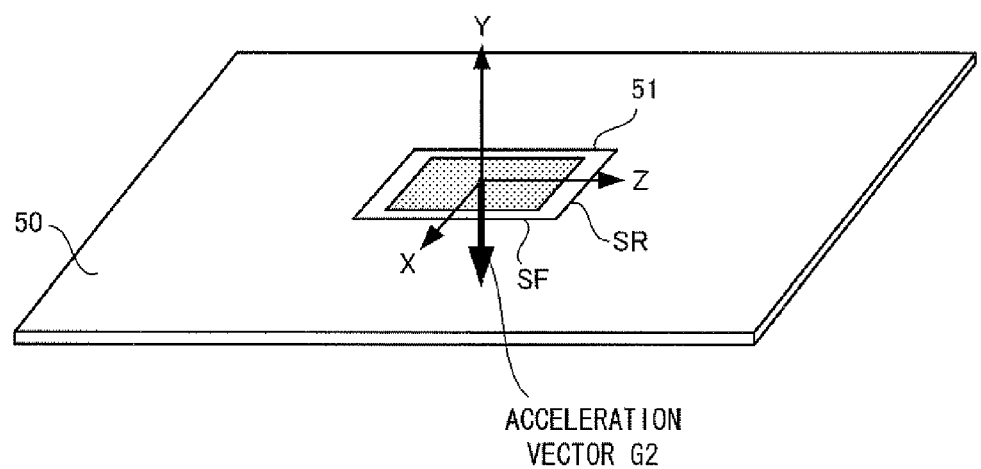

ORIENTATION A

ORIENTATION B

FIG. 16A
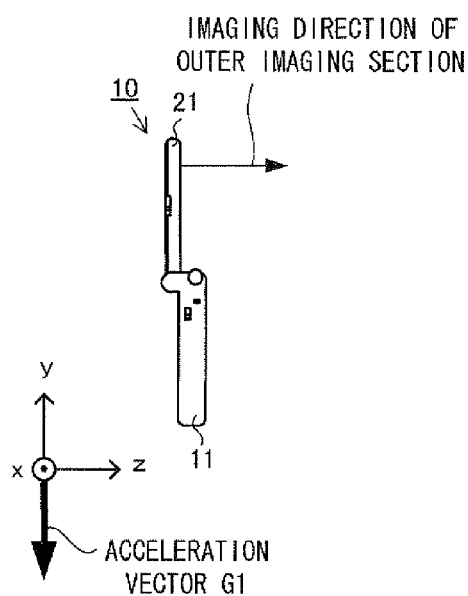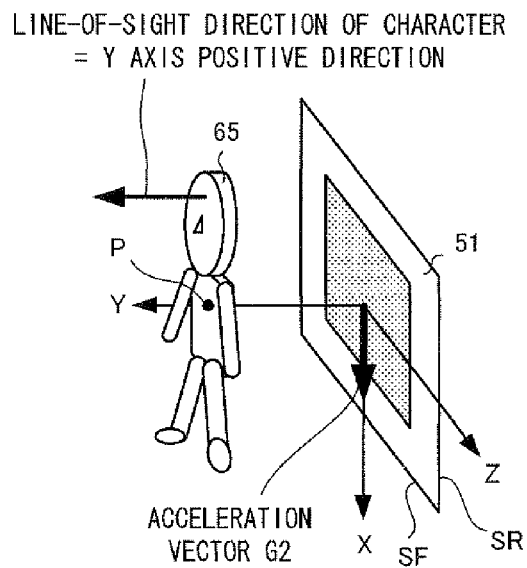
FIG. 16B
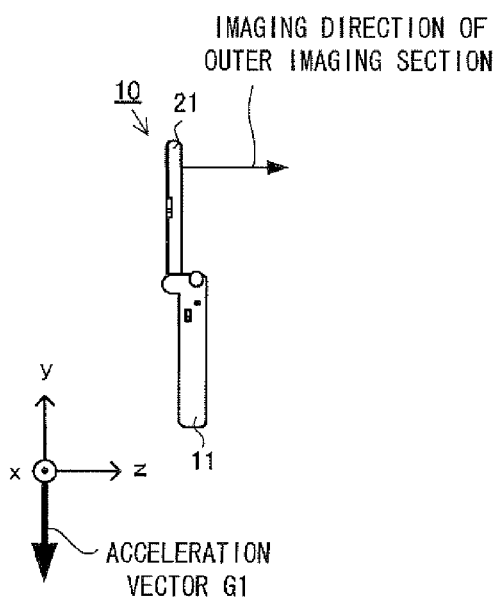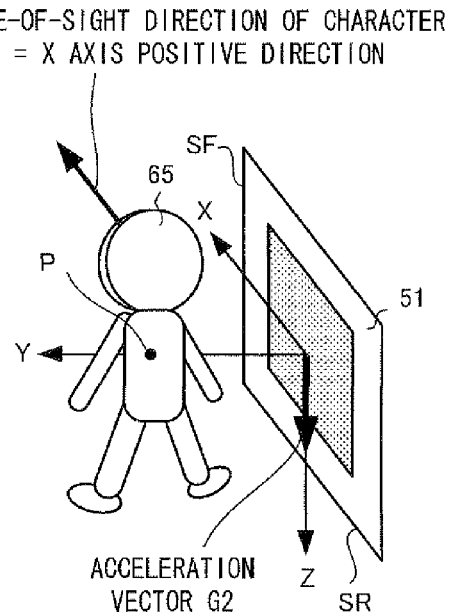

FIG. 16C
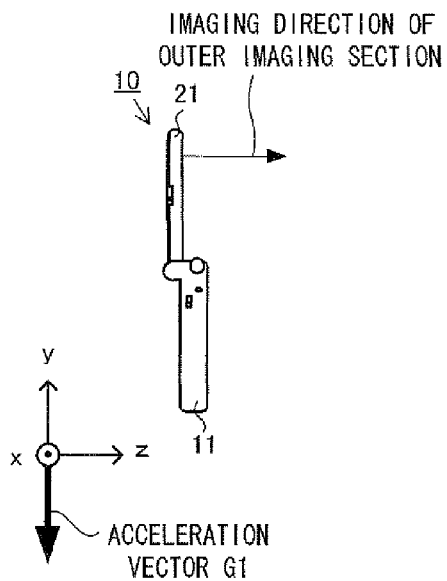
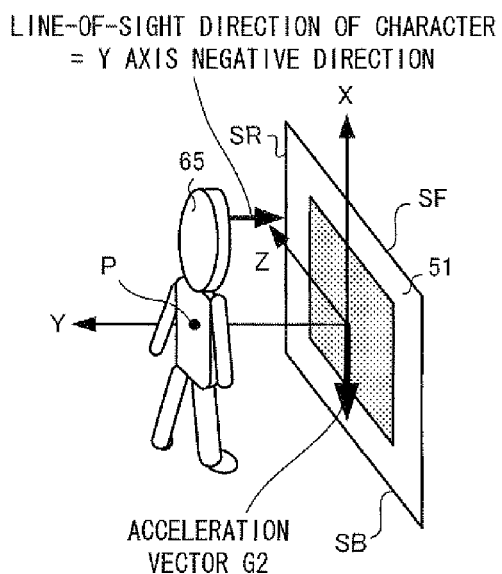
FIG. 16D
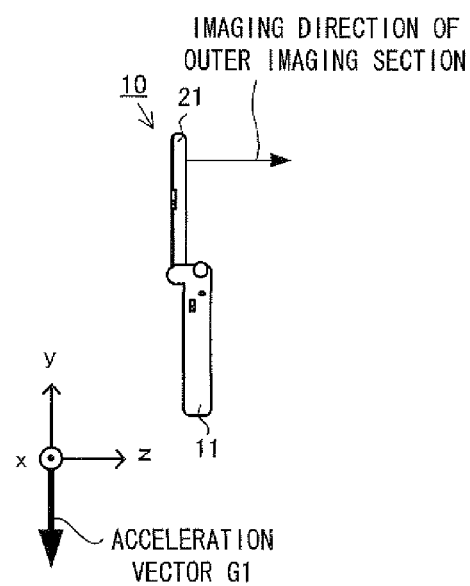
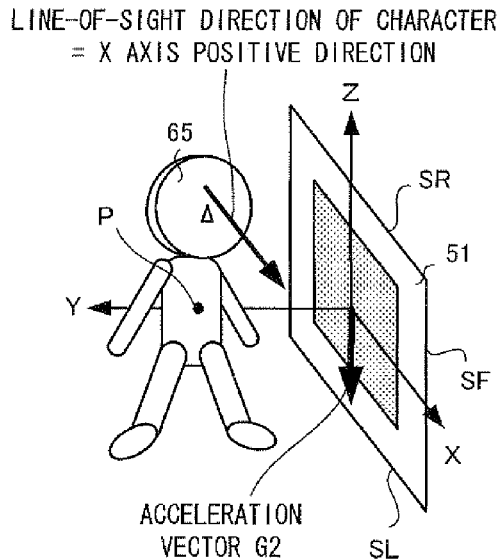

COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2011-86798, filed on Apr. 8, 2011, is incorporated herein by reference.

BACKGROUND OF THE INVENTION

1. Field of the Invention

The present invention relates to a computer-readable storage medium having an information processing program stored therein, an information processing apparatus, an information processing system, and an information processing method, for displaying an image on a display device.

2. Description of the Background Art

Conventionally, there is a game apparatus that takes, by a camera, an image of a game card placed in the real space and displays a virtual object at a position where the game card is displayed. For example, in Japanese Laid-Open Patent Publication No. 2006-72667 (Patent Document 1), an image of a game card placed in the real space is taken by a camera connected to a game apparatus, and the orientation and the direction of the game card, and the distance between the camera and the game card in the real space are calculated on the basis of the taken image. A virtual object to be displayed on a display device is changed in accordance with the calculated orientation, direction, and distance.

However, in the game apparatus disclosed in Patent Document 1, in order to change the display of the virtual object, it is necessary to greatly change the orientations of the camera and the game card. Thus, there is room for improvement in the operability of a user.

SUMMARY OF THE INVENTION

Therefore, an object of the present invention is to provide an information processing technique that allows various images to be displayed by a simple operation.

The present invention has the following features to attain the object mentioned above.

One embodiment of the present invention is a computer-readable storage medium having stored therein an information processing program that causes a computer of an information processing apparatus to operate as image obtaining means, orientation information obtaining means, specific object detection means, positional relation calculation means, display determination means, image generation means, and display control means. The image obtaining means sequentially obtains a taken image that is taken by imaging means. The orientation information obtaining means obtains orientation information indicating an orientation of the imaging means. The specific object detection means detects a specific object from the taken image obtained by the image obtaining means. The positional relation calculation means calculates a relative positional relation between the specific object and the imaging means. The display determination means determines at least any of a display form of a virtual object, a type of the virtual object, and the number of the virtual objects, on the basis of at least the orientation information. The image generation means generates an image of the virtual object corresponding to the determination by the display determination means, on the basis of the positional relation calculated by the positional relation calculation means. The display control means displays the image of the virtual object on a display device.

According to the above, at least any of the display form of the virtual object, the type of the virtual object, and the number of the virtual objects is determined on the basis of the orientation information indicating the orientation of the imaging means. Then, the image of the virtual object corresponding to the determination can be generated on the basis of the relative positional relation between the specific object and the imaging means and can be displayed on the display device.

In another feature of the present invention, the display determination means may determine the display form of the virtual object on the basis of at least the orientation information.

In still another feature of the present invention, the display determination means may determine at least any of the display form of the virtual object, the type of the virtual object, and the number of the virtual objects, on the basis of the positional relation and the orientation information.

According to the above, at least any of the display form of the virtual object, the type of the virtual object, and the number of the virtual objects can be determined on the basis of the positional relation and the orientation information. As the display form of the virtual object, for example, a position, an attitude (including an orientation and a pose), a facial expression, a motion pattern, of the virtual object, an item possessed by the virtual object, the stereoscopic effect of the virtual object, the color and the brightness of the virtual object, or the like can be determined.

In still another feature of the present invention, the display determination means may determine the display form of the virtual object in accordance with an orientation of the specific object with respect to a predetermined direction indicated by the orientation information.

According to the above, the display form of the virtual object can be determined in accordance with the orientation of the specific object with respect to the predetermined direction in the real space.

In still another feature of the present invention, the orientation information obtaining means may obtain, as the orientation information, orientation information indicating a predetermined direction in a coordinate system based on the imaging means. The display determination means may calculate a predetermined direction in a coordinate system based on the specific object on the basis of the positional relation and the orientation information obtained by the orientation information obtaining means, and may determine the display form of the virtual object on the basis of the calculated predetermined direction.

According to the above, the display form of the virtual object can be determined on the basis of the predetermined direction in the coordinate system based on the specific object.

In still another feature of the present invention, at least when the calculated predetermined direction indicates that the specific object is located in a real space so as to be perpendicular to the predetermined direction indicated by the orientation information, the display determination means may determine the display form of the virtual object as a first display form. At least when the calculated predetermined direction indicates that the specific object is located in the real space so as to be parallel to the predetermined direction indicated by the orientation information, the display determination means may determine the display form of the virtual object as a second display form.

According to the above, the display form of the virtual object can be different between the case where the specific object is located so as to be perpendicular to the predetermined direction and the case where the specific object is located so as to be parallel to the predetermined direction.

In still another feature of the present invention, the display determination means may determine an orientation of the virtual object with respect to the specific object in accordance with the orientation of the specific object with respect to the predetermined direction indicated by the orientation information.

According to the above, the orientation of the virtual object with respect to the specific object can be determined.

In still another feature of the present invention, at least when the specific object is located in a real space so as to be perpendicular to the predetermined direction indicated by the orientation information, the display determination means may determine the orientation of the virtual object such that the virtual object has an orientation perpendicular to the specific object. At least when the specific object is located in the real space so as to be parallel to the predetermined direction indicated by the orientation information, the display determination means may determine the orientation of the virtual object such that the virtual object has an orientation parallel to the specific object.

According to the above, when the specific object is located so as to be perpendicular to the predetermined direction (e.g., the direction of gravity) (e.g., when a marker is placed on a table), the orientation of the virtual object can be determined such that the virtual object has an orientation perpendicular to the specific object. In addition, when the specific object is located so as to be parallel to the predetermined direction (e.g., the direction of gravity) (e.g., when the marker is attached to a wall), the orientation of the virtual object can be determined such that the virtual object has an orientation parallel to the specific object.

In still another feature of the present invention, at least when the specific object is located in the real space so as to be parallel to the predetermined direction indicated by the orientation information, the display determination means may determine the orientation of the virtual object as a first orientation if a rotation angle of at least a surface of the specific object about an axis perpendicular to the surface is a first angle, and may determine the orientation of the virtual object as a second orientation if the rotation angle is a second angle.

According to the above, for example, when the specific object is located so as to be parallel to the predetermined direction (e.g., the direction of gravity) (e.g., when the marker is attached to a wall), the orientation of the virtual object can be determined. For example, the orientation of the virtual object can be determined as the first orientation if the rotation angle of at least the surface of the specific object about an axis perpendicular to the surface is the first angle, and the orientation of the virtual object can be determined as the second orientation if the rotation angle is the second angle.

In still another feature of the present invention, the predetermined direction may be a direction of gravity.

In still another feature of the present invention, when the predetermined direction in the coordinate system based on the specific object is in a first range, the display determination means may determine the display form of the virtual object as a first form. When the predetermined direction in the coordinate system based on the specific object is in a second range that is separated from the first range by a predetermined boundary, the display determination means may determine the display form of the virtual object as a second form. When the display form of the virtual object is changed from the first form to the second form, the display determination means may set the predetermined boundary on the first range side as compared to that when the display form of the virtual object is changed from the second form to the first form.

According to the above, the display form of the virtual object can be prevented from being frequently changed between the first form and the second form.

In still another feature of the present invention, the display control means may display the image of the virtual object corresponding to the determination by the display determination means, on the display device such that the image of the virtual object is superimposed on the taken image that is taken by the imaging means or a real space that is viewed through a screen of the display device.

According to the above, the image of the virtual object can be displayed on the display device so as to be superimposed on the real space.

In still another feature of the present invention, first information indicating the first orientation and second information indicating the second orientation may be provided on the specific object. The first information is visible from an appropriate direction when a user views the specific object from a first direction. The second information is visible from an appropriate direction when the user views the specific object from a second direction.

According to the above, since the information that is easily understood by the user is provided on the specific object, the user can intuitively perform an operation.

The information processing apparatus may include an orientation sensor for detecting the orientation information, and the orientation information obtaining means may obtain the orientation information from the orientation sensor.

Another embodiment of the present invention may be an information processing apparatus implementing the above respective means. Still another embodiment of the present invention may be one information processing system in which multiple components implementing the above respective means operate in an interactive manner. The image processing system may be constituted of one apparatus or a plurality of apparatuses.

Further, another embodiment of the present invention may be an information processing system comprising an information processing apparatus and a marker. The information processing apparatus comprises imaging means, orientation detection means, image obtaining means, orientation information obtaining means, marker detection means, positional relation calculation means, display determination means, image generation means, and display control means. The imaging means takes an image of the marker. The orientation detection means detects an orientation of the imaging means. The image obtaining means sequentially obtains a taken image that is taken by the imaging means. The orientation information obtaining means obtains orientation information indicating an orientation of the imaging means. The marker detection means detects the marker from the taken image obtained by the image obtaining means. The positional relation calculation means calculates a relative positional relation between the marker and the imaging means. The display determination means determines at least any of a display form of a virtual object, a type of the virtual object, and the number of the virtual objects, on the basis of at least the orientation information. The image generation means generates an image of the virtual object corresponding to the determination by the display determination means, on the basis of the positional relation calculated by the positional relation calculation means. The display control means displays the image of the virtual object on a display device.

According to the present invention, various images can be displayed by a simple operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating an example of a marker 51 used in a display process according to an embodiment;

FIG. 13 is a diagram illustrating a situation where an image of the marker 51 placed on a table 50 parallel to the ground is taken by the outer imaging section 23 of the game apparatus 10;

FIG. 16A is a diagram illustrating an orientation of the virtual character 65 when the marker 51 is attached to a surface perpendicular to the ground, such that the side SF of the marker 51, at which the letters "Front" are written, is located on the lower side;

FIG. 16B is a diagram illustrating an orientation of the virtual character 65 when the marker 51 is attached to a surface perpendicular to the ground, such that the side SR of the marker 51, at which the letters "Right" are written, is located on the lower side;

FIG. 16C is a diagram illustrating an orientation of the virtual character 65 when the marker 51 is attached to a surface perpendicular to the ground, such that the side SB of the marker 51, at which the letters "Back" are written, is located on the lower side;

FIG. 16D is a diagram illustrating an orientation of the virtual character 65 when the marker 51 is attached to a surface perpendicular to the ground, such that a side SL of the marker 51, at which letters "Left" are written, is located on the lower side;

DESCRIPTION OF THE PREFERRED EMBODIMENTS (Structure of Game Apparatus)

Figure 1:
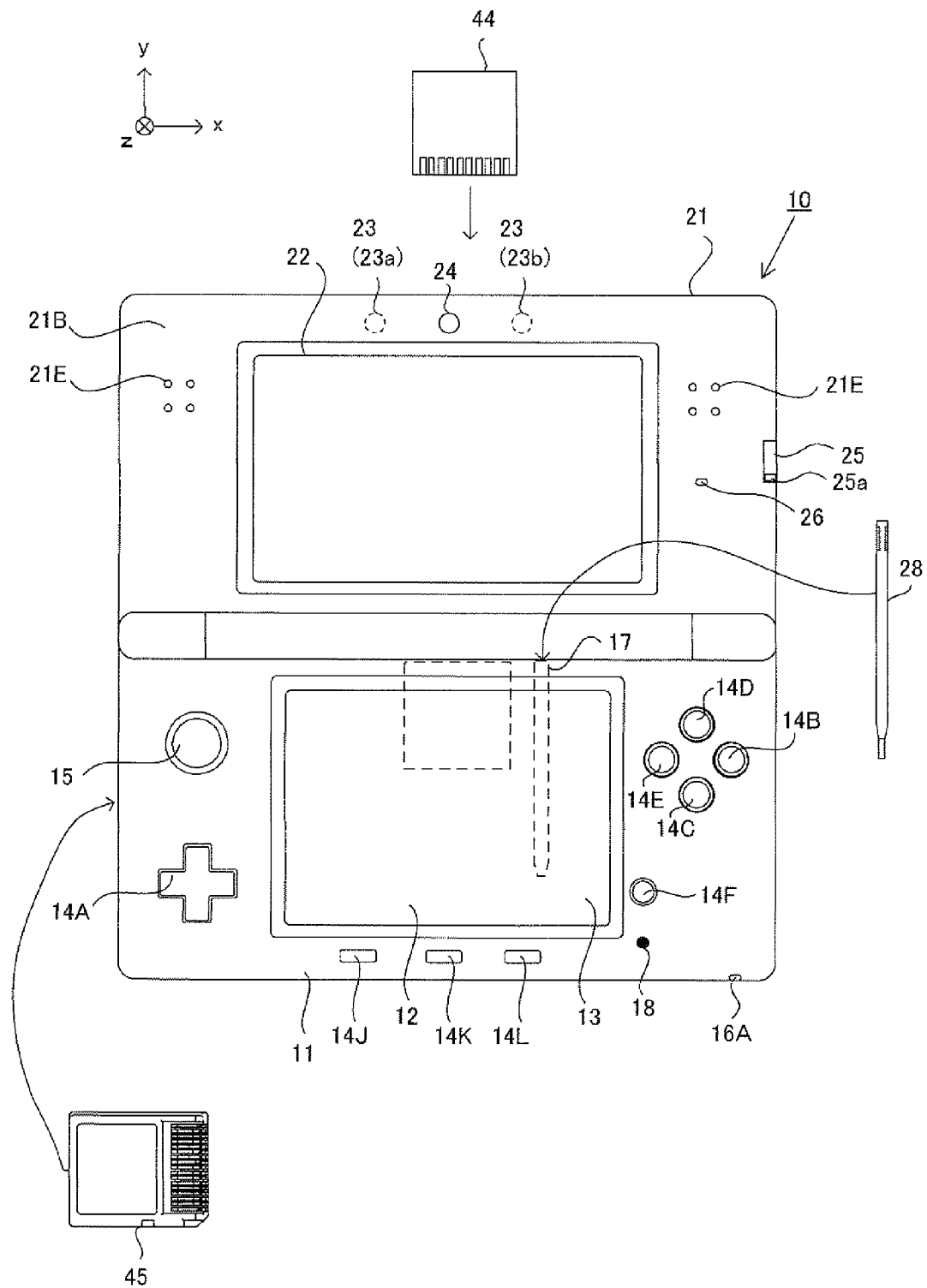
FIG. 1 is a Front view showing an external of a game apparatus 10 in an opened state.
Figure 2:
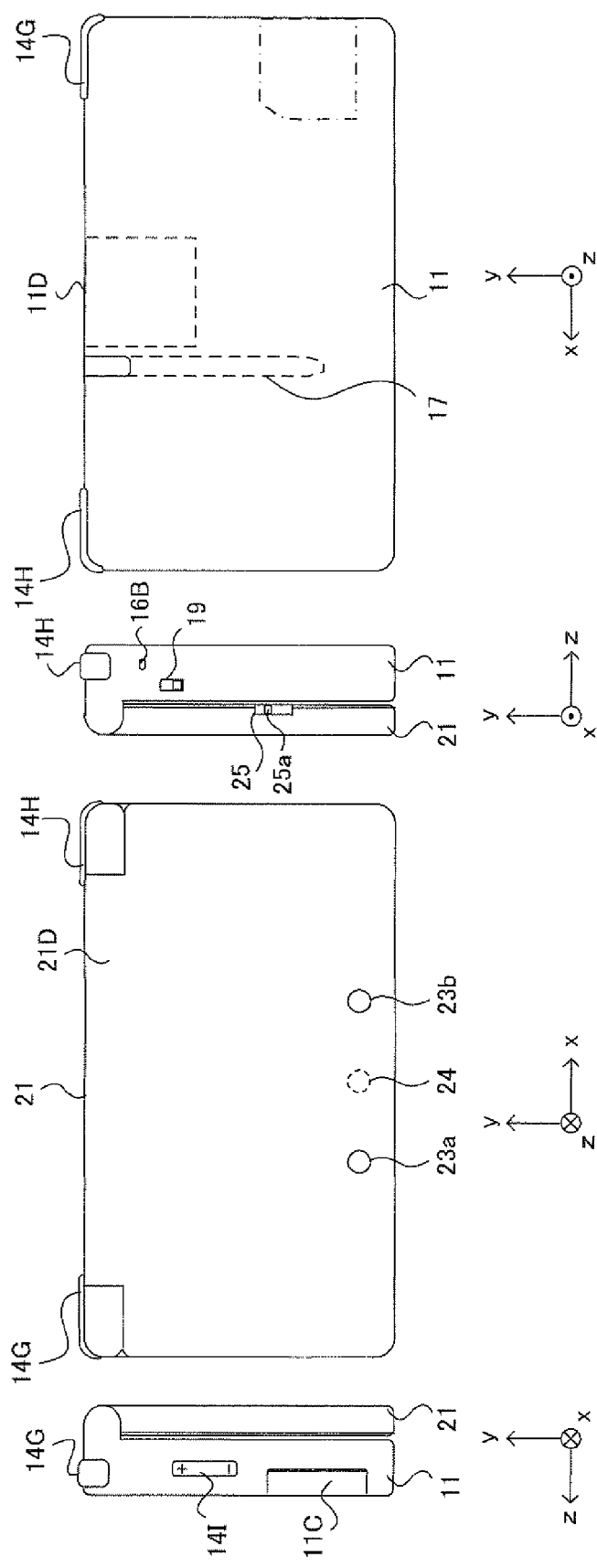
FIG. 2A is a Left side view of the game apparatus 10 in a closed state.
FIG. 2B is a Front view of the game apparatus 10 in the closed state.
FIG. 2C is a Right side view of the game apparatus 10 in the closed state.
FIG. 2D is a rear view of the game apparatus 10 in the closed state.

Hereinafter, a game apparatus according to an embodiment of the present invention will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIGS. 1 to 2D. FIG. 1 shows the game apparatus 10 in the opened state and FIGS. 2A to 2D each show the game apparatus 10 in the closed state. The game apparatus 10 is able to take an image by an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 to 2D. The game apparatus 10 includes a lower housing 11 and an upper housing 21 as shown in FIGS. 1 to 2D. The lower housing 11 and the upper housing 21 are connected to each other so as to be openable and closable (foldable). In the present embodiment, the lower housing 11 and the upper housing 21 have horizontally long plate-like rectangular shapes and are connected to each other at long side portions thereof so as to be pivotable with respect to each other.

(Description of Lower Housing)

Initially, a structure of the lower housing 11 will be described. As shown in FIGS. 1 to 2D, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the present embodiment, any other display device such as a display device using an EL (Electro Luminescence) or the like, may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A has a cross shape, and includes buttons for indicating an upward, a downward, a leftward, or a rightward direction. The buttons 14A to 14E, the selection button 14J, the HOME button 14K, and the start button 14L are assigned functions, respectively, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIGS. 2B and 2D, an L button 14G and an R button 14H are provided on the upper side surface of the lower housing 11. The L button 14G and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 to 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using, for example, an EL (Electro Luminescence), or the like may be used. In addition, a display device having any resolution may be used as the upper LCD 22.

The upper LCD 22 is a display device capable of displaying a stereoscopically visible image. Further, in the present embodiment, a left-eye image and a right-eye image are displayed by using substantially the same display area. Specifically, the upper LCD 22 is a display device using a method in which the left-eye image and the right-eye image are alternately displayed in the horizontal direction in predetermined units (for example, every other line). Alternatively, the upper LCD 22 may be a display device using a method in which the left-eye image and the right-eye image are alternately displayed for a predetermined time period and the left-eye image and the right-eye image are viewed by the user's left eye and the right eye, respectively, by using glasses. In the present embodiment, the upper LCD 22 is a display device capable of displaying an image which is stereoscopically visible by the naked eye, and a lenticular lens type display device or a parallax barrier type display device is used which enables the left-eye image and the right eye image, which are alternately displayed in the horizontal direction, to be separately viewed by the left eye and right eye, respectively. In the present embodiment, the upper LCD 22 of a parallax barrier type is used. The upper LCD 22 displays, by using the right-eye image and the left eye image, an image (a stereoscopic image) which is stereoscopically visible by the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of shift of the right-eye image and the left-eye image in the horizontal direction is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed.

Further, a speaker hole 21E is provided on the inner side surface of the upper housing 21. A sound from a speaker 43 described below is outputted through the speaker hole 21E.

(Internal Configuration of Game Apparatus 10)

Figure 3:
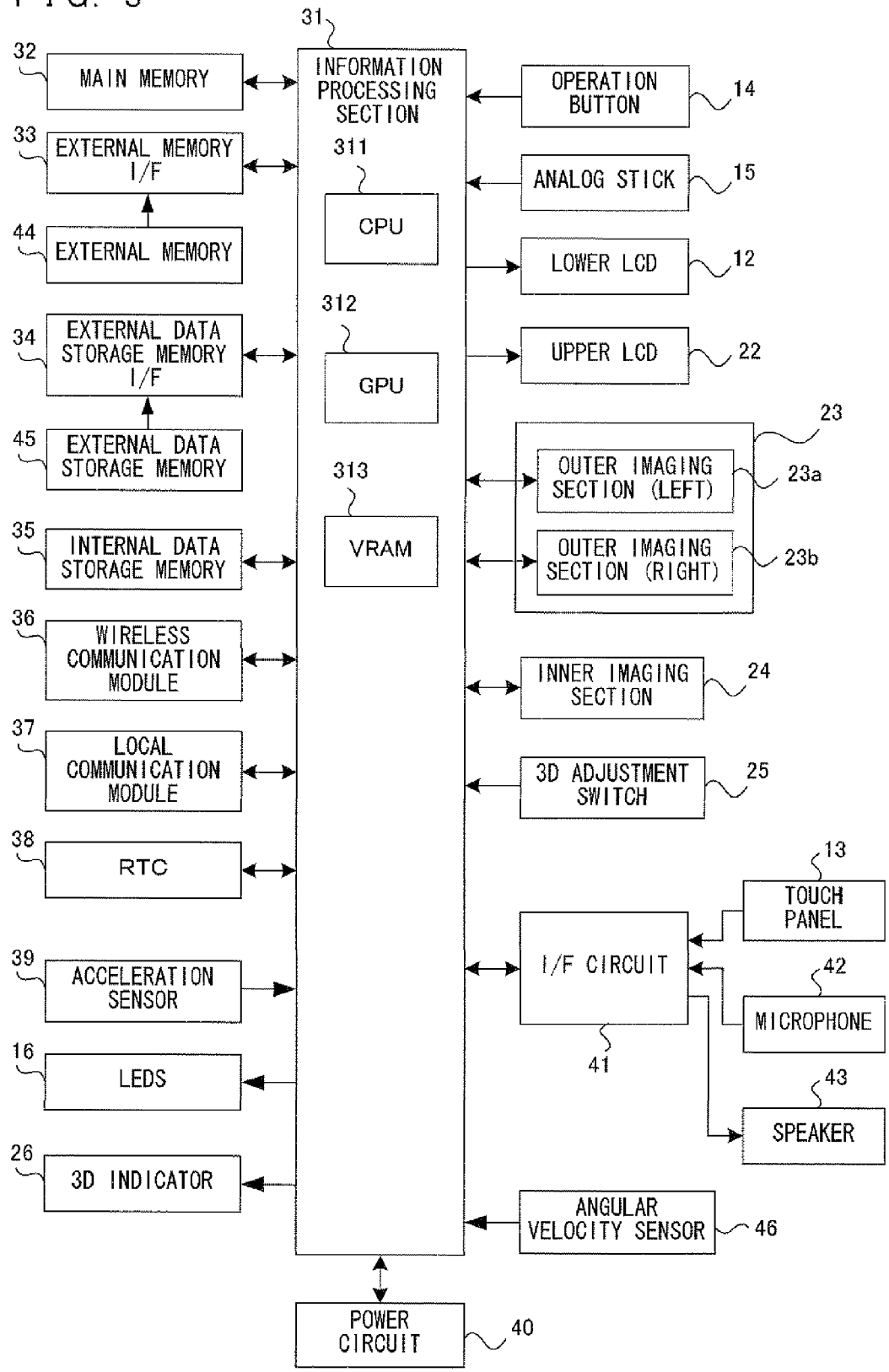
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The local communication module 37 has a function of performing wireless communication with a game apparatus of the same type by using a predetermined communication method (for example, communication through a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from another game apparatus of the same type by using the local communication module 37.

The acceleration sensor 39 is connected to the information processing section 31. The acceleration sensor 39 detects magnitudes of accelerations (linear accelerations) in directions of straight lines along three axial (xyz axial) directions, respectively. The acceleration sensor 39 is provided inside the lower housing 11. In the acceleration sensor 39, as shown in FIG. 1, the long side direction of the lower housing 11 is defined as the x-axial direction, the short side direction of the lower housing 11 is defined as the y-axial direction, and the direction orthogonal to the inner side surface (main surface) of the lower housing 11 is defined as the z-axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the OF circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position on which an input is made on an input surface of the touch panel 13. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Outline of Display Process of Present Embodiment)

Next, an outline of a display process performed in the game apparatus 10 according to the present embodiment will be described with reference to FIGS. 4 to 9. FIG. 4 is a diagram illustrating an example of a marker 51 used in the display process according to the present embodiment. In the present embodiment, when an image of the marker 51 shown in FIG. 4 is taken by the outer imaging section 23 of the game apparatus 10, a predetermined virtual character is displayed on the upper LCD 22.

As shown in FIG. 4, the marker 51 is made of a rectangular piece of paper, and letters "Front", "Right", "Back", and "Left" are printed near sides (SF, SR, SB, and SL), respectively, of the piece of paper. These letters written at each side are written such that these letters can be visually recognized from the front when each side is located on the lower side. For example, when the side SF, at which the letters "Front" are written, is located on the lower side, the letters "Front" can be visually recognized from the front, and the letters "Back" written at the side SB opposed to the side SF, at which the letters "Front" are written, are located upside down. In addition, a square region 51a is provided at the center of the piece of paper, and a predetermined pattern is drawn on the region 51a. Specifically, as shown in FIG. 4, there are square regions 51b, 51c, and 51d having a predetermined color (e.g., white), and there is also a region 51e filled with a color (e.g., black) different from that of these regions 51b, 51c, and 51d. The square regions 51b and 51c are arranged in a line parallel to the side SF at which the letters "Front" are written, and a line connecting the center of the square region 51b to the center of the square region 51c passes through the center of the marker 51. Further, the center of the square region 51d is located on a line extending from the center of the marker 51 perpendicularly to the side SB at which the letters "Back" are written.

Figure 5:
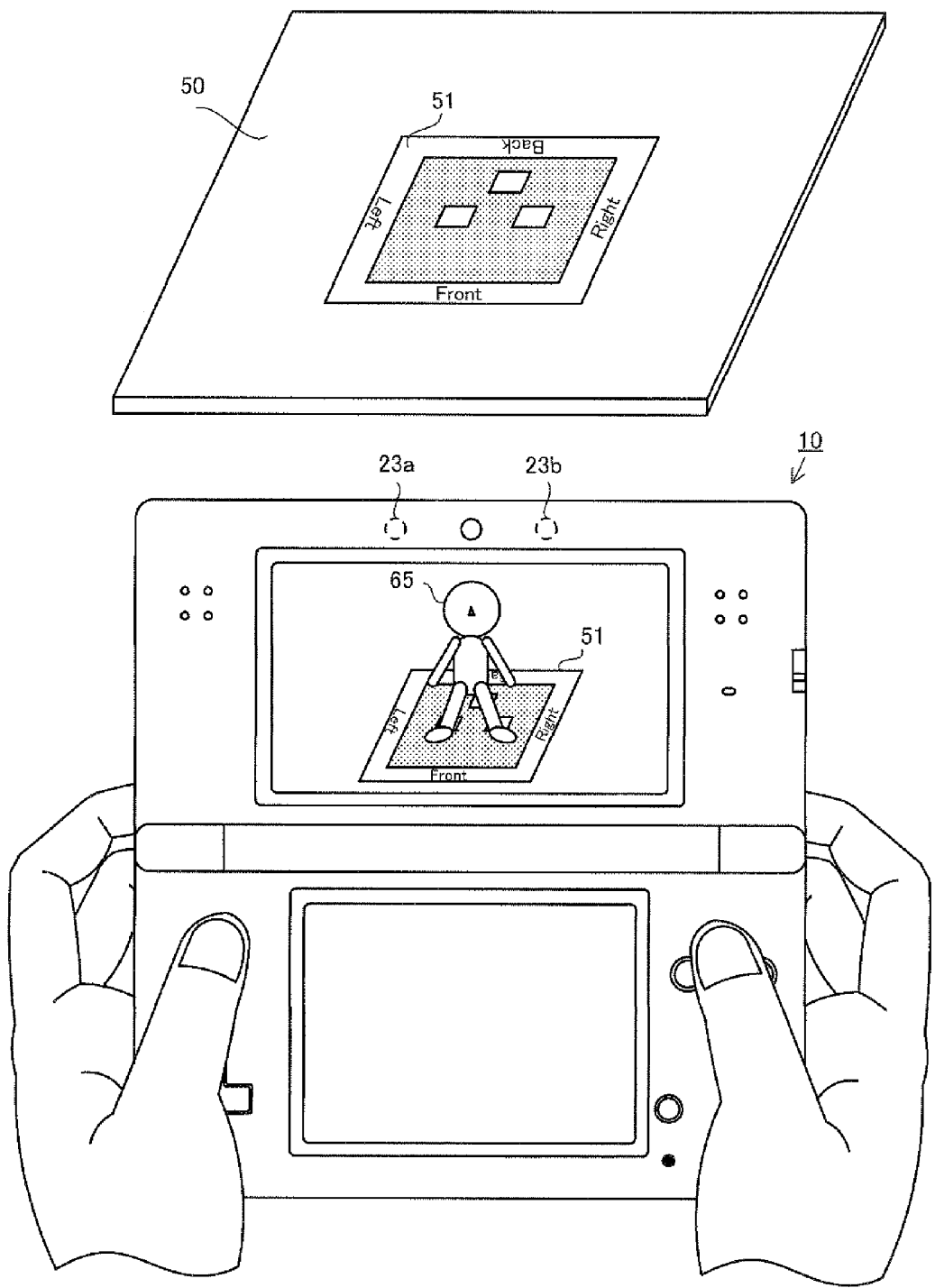
FIG. 5 is a diagram illustrating an example of an image displayed on an upper LCD 22 when an image of the marker 51 placed in the real space is taken by using an outer imaging section 23 of the game apparatus 10.

FIG. 5 is a diagram illustrating an example of an image displayed on the upper LCD 22 when an image of the marker 51 placed in the real space is taken by using the outer imaging section 23 of the game apparatus 10. As shown in FIG. 5, a table (or floor) 50 of which a placed surface is parallel to the ground (or perpendicular to the direction of gravity) is located in the real space, and the marker 51 is placed on the table 50. When an image of the marker 51 is taken by using the outer imaging section 23 of the game apparatus 10, an image of the real space including the marker 51 is displayed on the upper LCD 22 such that an image of a virtual character 65 is superimposed on the image of the real space. The image displayed on the upper LCD 22 is a stereoscopically visible image that can be stereoscopically viewed by the user. Specifically, as shown in FIG. 5, when an image of the marker 51 is taken from such a direction that the side SF of the marker 51, at which the letters "Front" are written, is located on the lower side, an image of the virtual character 65 viewed from the front is displayed on the upper LCD 22. The virtual character 65 looks as if standing at the center of the marker 51.

Figure 6:
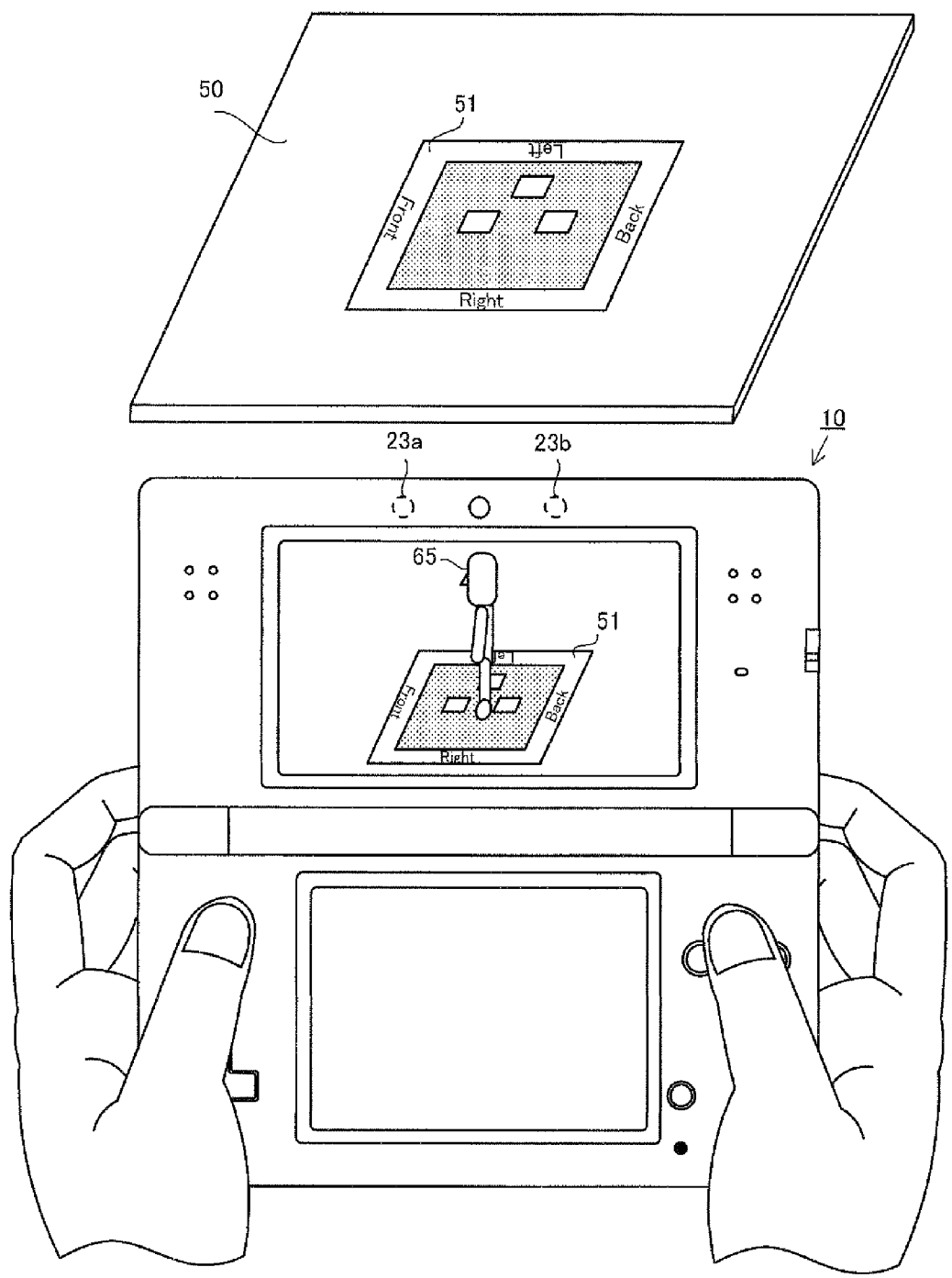
FIG. 6 is a diagram illustrating an example of an image displayed on the upper LCD 22 when an image of the marker 51 placed in the real space is taken by using the outer imaging section 23 of the game apparatus 10 from a direction different from that in FIG. 5.

FIG. 6 is a diagram illustrating an example of an image displayed on the upper LCD 22 when an image of the marker 51 placed in the real space is taken by using the outer imaging section 23 of the game apparatus 10 from a direction different from that in FIG. 5. As shown in FIG. 6, when an image of the marker 51 is taken from such a direction that the side SR of the marker 51, at which the letters "Right" are written, is located on the lower side, an image of the virtual character 65 viewed from the right (a taken image of the left side of the virtual character 65) is displayed on the upper LCD 22.

In addition, although not shown, when an image of the marker 51 is taken from such a direction that the side SB of the marker 51, at which the letters "Back" are written, is located on the lower side, an image of the virtual character 65 viewed from the back is displayed on the upper LCD 22. Further, when an image of the marker 51 is taken from such a direction the side SL of the marker 51, at which the letters "Left" are written, is located on the lower side, an image of the virtual character 65 viewed from the left (a taken image of the right side of the virtual character 65) is displayed on the upper LCD 22.

As described above, when the marker 51 is placed on the table 50 parallel to the ground and an image of the marker 51 is taken, an image in which the virtual character 65 looks as if existing in the real space and standing on the marker 51 is displayed on the upper LCD 22. Then, when the marker 51 is rotated about the central axis of the marker 51 or the game apparatus 10 is rotated about the central axis of the marker 51, the direction in which the virtual character 65 on the marker 51 is viewed also changes in accordance with this rotation.

As described below, by taking an image of the marker 51 and detecting the maker 51, the game apparatus 10 establishes a marker coordinate system based on the marker 51 and locates the virtual character 65 in the marker coordinate system. By taking images of the virtual character 65 located in the marker coordinate system by a virtual stereo camera, a stereoscopically visible image of the virtual character 65 is generated. Then, the generated stereoscopically visible image of the virtual character 65 and a stereoscopically visible image of the real space that is taken by the outer imaging section 23 and that includes the marker 51 are superimposed on each other, and a stereoscopically visible image obtained by this superimposition is displayed on the upper LCD 22. When the virtual character 65 is displayed so as to be superimposed on the taken image of the real space including the marker 51 as described above, the virtual character 65 looks as if existing on the marker 51 in the real space.

Figure 7:
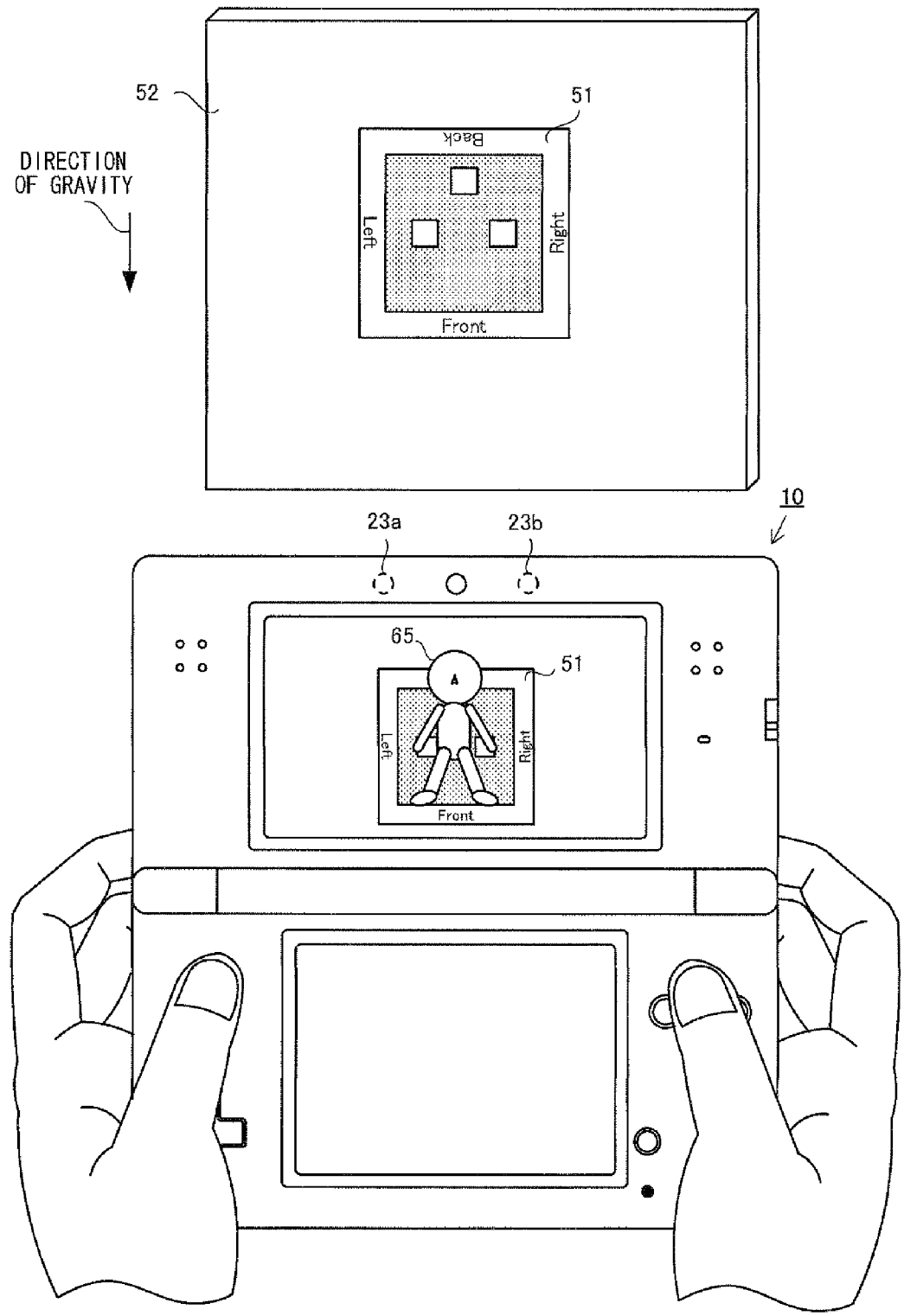
FIG. 7 is a diagram illustrating an example of an image displayed on the upper LCD 22 when the marker 51 is attached to a wall 52 such that a side SF of the marker 51, at which letters "Front" are written, is located on the lower side and an image of the marker 51 is taken.

Next, the case where the marker 51 is attached to a wall perpendicular to the ground will be described. FIG. 7 is a diagram illustrating an example of an image displayed on the upper LCD 22 when the marker 51 is attached to a wall 52 such that the side SF of the marker 51, at which the letters "Front" are written, is located on the lower side and an image of is taken.

As shown in FIG. 7, the marker Si is attached to the wall 52 perpendicular to the ground (parallel to the direction of gravity) such that the side SF of the marker 52, at which the letters "Front" are written, is located on the lower side. When an image of the marker 51 is taken by the outer imaging section 23 of the game apparatus 10, the virtual character 65 that stands so as to be parallel to the marker 51 (the wall 52) and that faces the front is displayed on the upper LCD 22 so as to be superimposed on a taken image of the marker 51. In this case, the user feels as if the virtual character 65 existed on the near side of the marker 51. When the marker 51 is attached to the wall 52 such that the side SF of the marker 51, at which the letters "Front" are written, is located on the lower side and an image of the marker 51 is taken, an image is displayed in which the virtual character 65 stands so as to be parallel to the wall 52 and faces the front.

Figure 8:
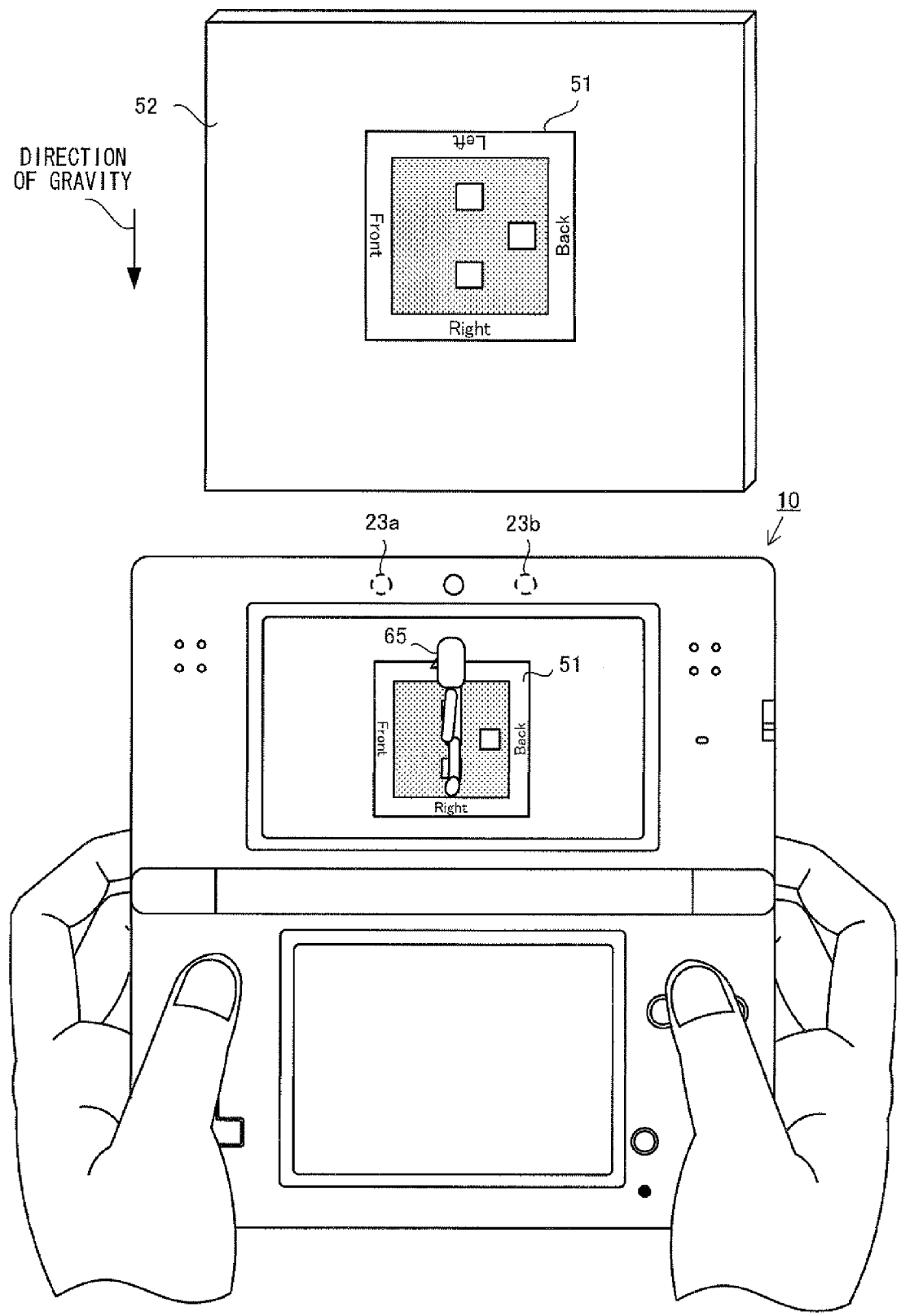
FIG. 8 is a diagram illustrating an example of an image displayed on the upper LCD 22 when the marker 51 is attached to the wall 52 such that a side SR of the marker 51, at which letters "Right" are written, is located on the lower side and an image of the marker 51 is taken.

FIG. 8 is a diagram illustrating an example of an image displayed on the upper LCD 22 when the marker 51 is attached to the wall 52 such that the side SR of the marker 51, at which the letters "Right" are written, is located on the lower side and an image of the marker 51 is taken. As shown in FIG. 8, when the marker 51 is attached to the wall 52 such that the side SR of the marker 51, at which the letters "Right" are written, is located on the lower side and an image of the marker 51 is taken by the outer imaging section 23 of the game apparatus 10, the virtual character 65 that stands so as to be parallel to the marker 51 (the wall 52) and that faces the left is displayed on the upper LCD 22. In other words, an image of the virtual character 65 viewed from the right side of the virtual character 65 is displayed on the upper LCD 22 so as to be superimposed on an taken image of the marker 51. In this case, the user feels as if the virtual character 65 existed on the near side of the marker 51. When the marker 51 is attached to the wall 52 such that the side SR of the marker 51, at which the letters "Right" are written, is located on the lower side and an image of the marker 51 is taken as described above, an image of the virtual character 65 viewed from the right (an image in which the virtual character 65 stands so as to be parallel to the wall 52 and faces the left) is displayed.

Figure 9:
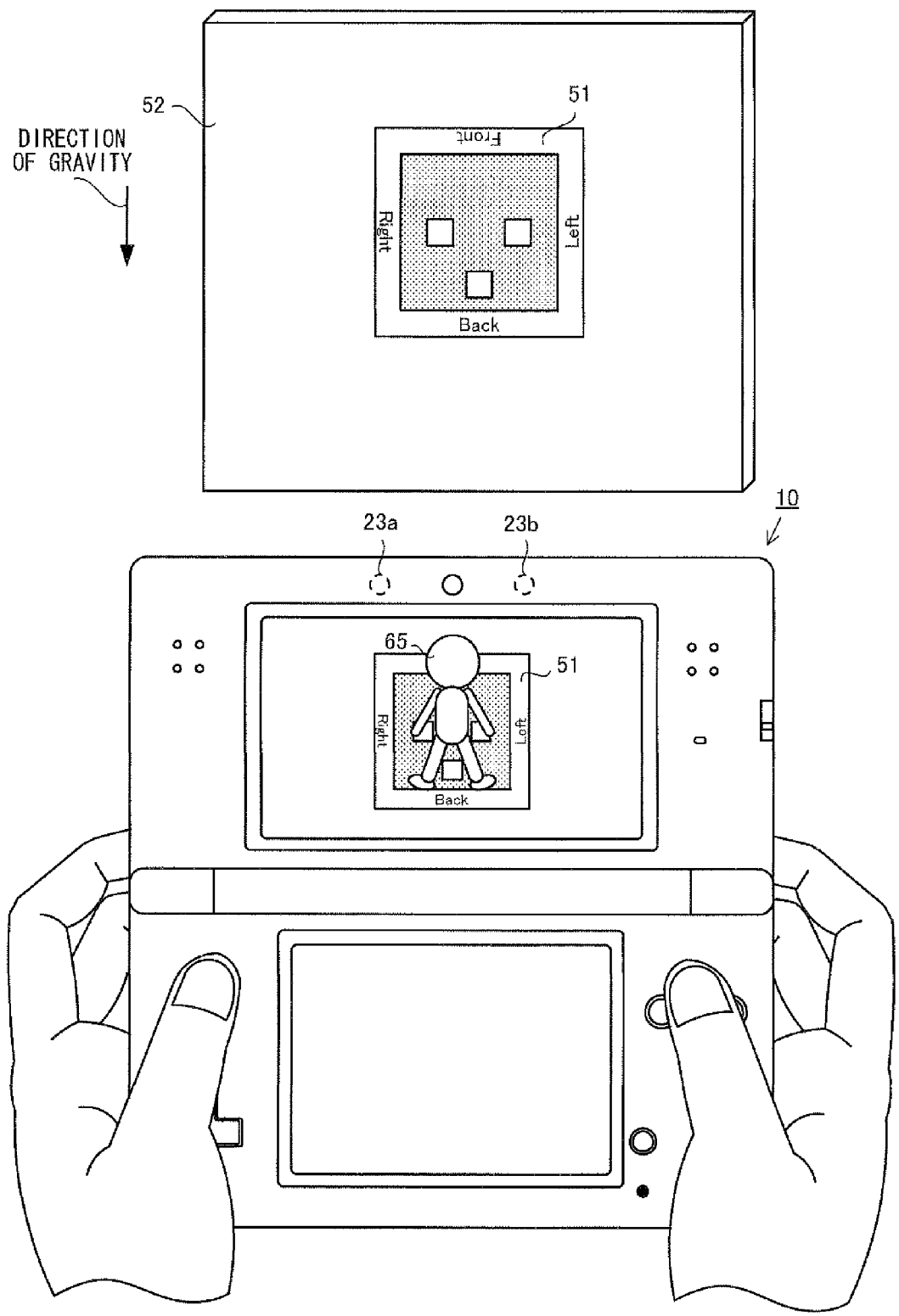
FIG. 9 is a diagram illustrating an example of an image displayed on the upper LCD 22 when the marker 51 is attached to the wall 52 such that a side SB of the marker 51, at which letters "Back" are written, is located on the lower side and an image of the marker 51 is taken.

FIG. 9 is a diagram illustrating an example of an image displayed on the upper LCD 22 when the marker 51 is attached to the wall 52 such that the side SB of the marker 51, at which the letters "Back" are written, is located on the lower side and an image of the marker 51 is taken. As shown in FIG. 9, when the marker 51 is attached to the wall 52 such that the side SB of the marker 51, at which the letters "Back" are written, is located on the lower side and an image of the marker 51 is taken by the outer imaging section 23 of the game apparatus 10, the virtual character 65 that stands so as to be parallel to the marker 51 (the wall 52) and that faces the back is displayed on the upper LCD 22. In other words, an image of the virtual character 65 viewed from the back side of the virtual character 65 is displayed on the upper LCD 22 so as to be superimposed on a taken image of the marker 51. In this case, the user feels as if the virtual character 65 existed on the near side of the marker 51. When the marker 51 is attached to the wall 52 such that the side SB of the marker 51, at which the letters "Back" are written, is located on the lower side and an image of the marker 51 is taken as described above, an image is displayed in which the virtual character 65 stands so as to be parallel to the wall 52 and faces the back.

Although not shown, when an image of the marker 51 that is attached to the wall 52 such that the side SL of the marker 51, at which the letters "Left" are written, is located on the lower side is taken by the outer imaging section 23, an image of the virtual character 65 viewed from the left (an image in which the virtual character 65 stands so as to be parallel to the wall 52 and faces the right) is displayed.

As described above, when the marker 51 is placed on the table 50 or the like parallel to the ground and an image of the marker 51 is taken by the outer imaging section 23, the virtual character 65 has an orientation perpendicular to the table 50 and is displayed as if the virtual character 65 stood on the table 50 (see FIGS. 4 and 5). On the other hand, when the marker 51 is attached to the wall 52 or the like perpendicular to the ground and an image of the marker 52 is taken by the outer imaging section 23, the virtual character 65 has an orientation parallel to the wall 52 and is displayed as if the virtual character 65 stood so as to be parallel to the wall 52 (see FIGS. 7 to 9).

Although details will be described below, the game apparatus 10 determines whether or not the marker 51 is placed so as to be parallel to the ground or perpendicular to the ground, on the basis of the values of accelerations detected by the acceleration sensor 39. Then, in accordance with a result of the determination, the game apparatus 10 determines an orientation of the virtual character 65.

(Details of Display Process)

Figure 10:
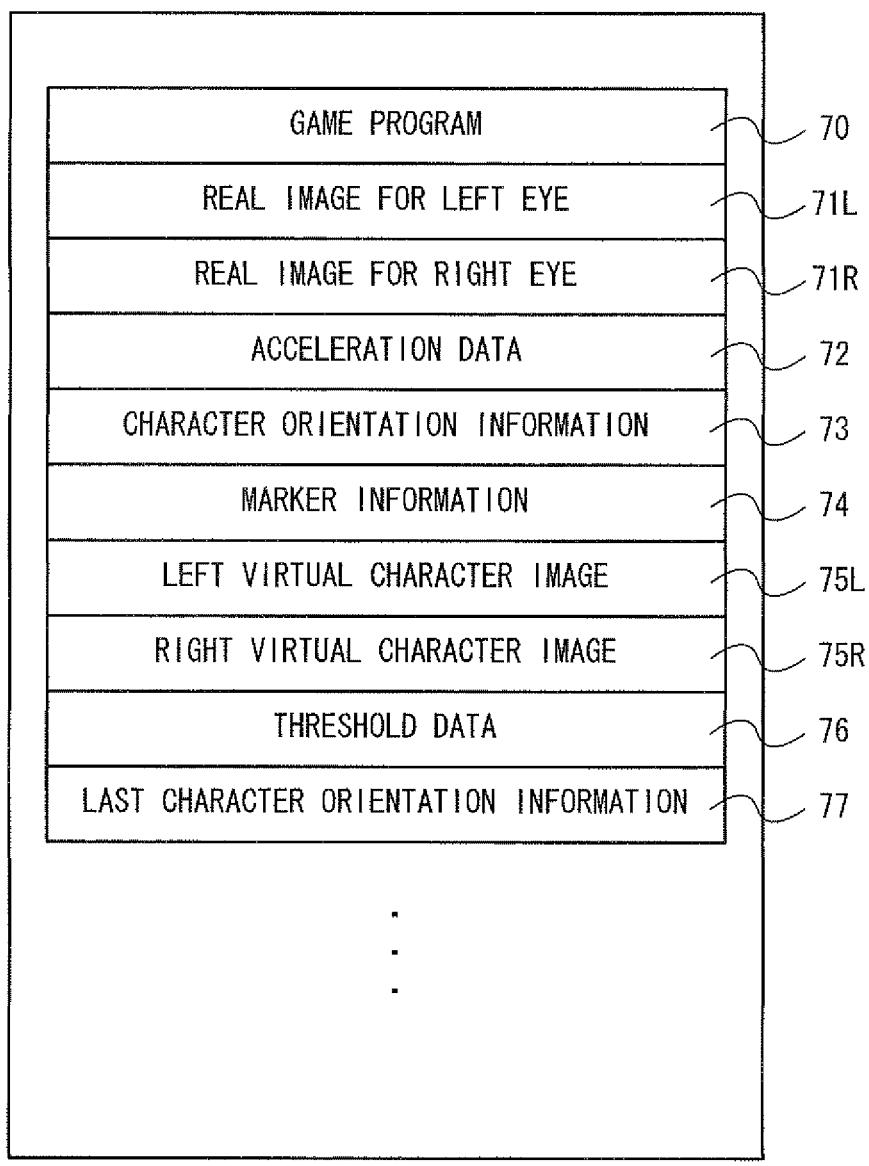
FIG. 10 is a diagram illustrating a memory map of a RAM (a main memory 32 and the like) of the game apparatus 10.

Next, details of the display process according to the present embodiment will be described with reference to FIGS. 10 to 19. First, main data stored in the main memory 32 and the VRAM 313 (hereinafter, they may collectively be referred to as RAM) in the display process will be described. FIG. 10 is a diagram illustrating a memory map of the RAM (the main memory 32 and the like) of the game apparatus 10. As shown in FIG. 10, a game program 70, a real image 71L for a left eye, a real image 71R for a right eye, acceleration data 72, character orientation information 73, marker information 74, a left virtual character image 75L, a right virtual character image 75R, threshold data 76, last character orientation information 77, and the like are stored in the RAM. In addition to them, data indicating the shape of the virtual character 65, data concerning a button operation performed by the user, and the like are stored in the RAM.

The game program 70 is a program for causing the information processing section 31 (the CPU 311) to perform a display process illustrated in a flowchart described below.

The real image 71L for a left eye is an image taken by the outer imaging section (left) 23a, and is a real image for a left eye that is viewed with the left eye of the user. The real image 71R for a right eye is an image taken by the outer imaging section (right) 23b, and is a real image for a right eye that is viewed with the right eye of the user.

The acceleration data 72 indicates the value of an acceleration, in each of the axial (x-axial, y-axial, z-axial) directions, which is detected by the acceleration sensor 39. The acceleration sensor 39 detects the magnitude of a linear acceleration along each axis, with: the long side direction of the lower housing 11 being defined as the x-axial direction; the short, side direction of the lower housing 11 being defined as the y-axial direction; and the direction orthogonal to the inner side surface (main surface) of the lower housing 11 being defined as the z-axial direction. The acceleration sensor 39 detects an acceleration in each axial direction at predetermined time intervals, and the value of the acceleration in each axial direction is stored as the acceleration data 72 at the predetermined time intervals.

The character orientation information 73 is information indicating a position and an orientation of the virtual character 65. The information indicating a position and an orientation of the virtual character 65 is information indicating a position and an orientation of the virtual character 65 in a virtual space (a marker coordinate system) in which the virtual character 65 is located. Specifically, the information indicating a position and an orientation of the virtual character 65 is represented by a matrix.

The marker information 74 is information indicating a position and an orientation of the marker 51 with respect to the game apparatus 10 (or the outer imaging section 23), and is information indicating a position and an orientation of the marker 51 with respect to the game apparatus 10 in the marker coordinate system (see FIG. 12) described below. The information indicating a position and an orientation of the marker 51 is represented by a matrix.

Figure 17:
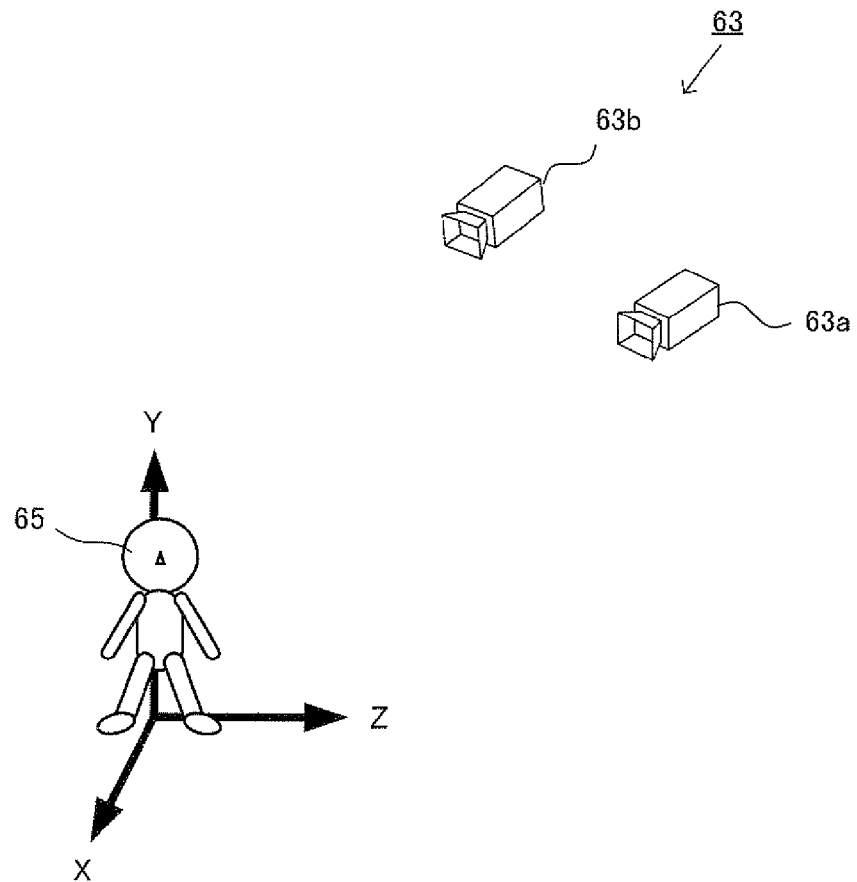
FIG. 17 is a diagram illustrating a virtual stereo camera 63 and the virtual character 65 that are set in a virtual space.

The left virtual character image 75L is an image of the virtual character 65, in the virtual space, which is taken by a left virtual camera 63a of a virtual stereo camera 63 (see FIG. 17). The right virtual character image 75R is an image of the virtual character 65, in the virtual space, which is taken by a right virtual camera 63b of the virtual stereo camera 63 (see FIG. 17). As described below, the virtual stereo camera 63 for taking an image of the virtual character 65 is set in the virtual space (the marker coordinate system). The left virtual character image 75L and the right virtual character image 75R are images of the virtual character 65 taken by the virtual stereo camera 63.

The threshold data 76 indicates a threshold used for determining an orientation of the virtual character 65.

The last character orientation information 77 indicates a position and an orientation of the virtual character 65 that are determined in processing in the last frame.

(Description of Flowchart)

Next, the display process will be described in detail with reference to FIG. 11.

Figure 11:
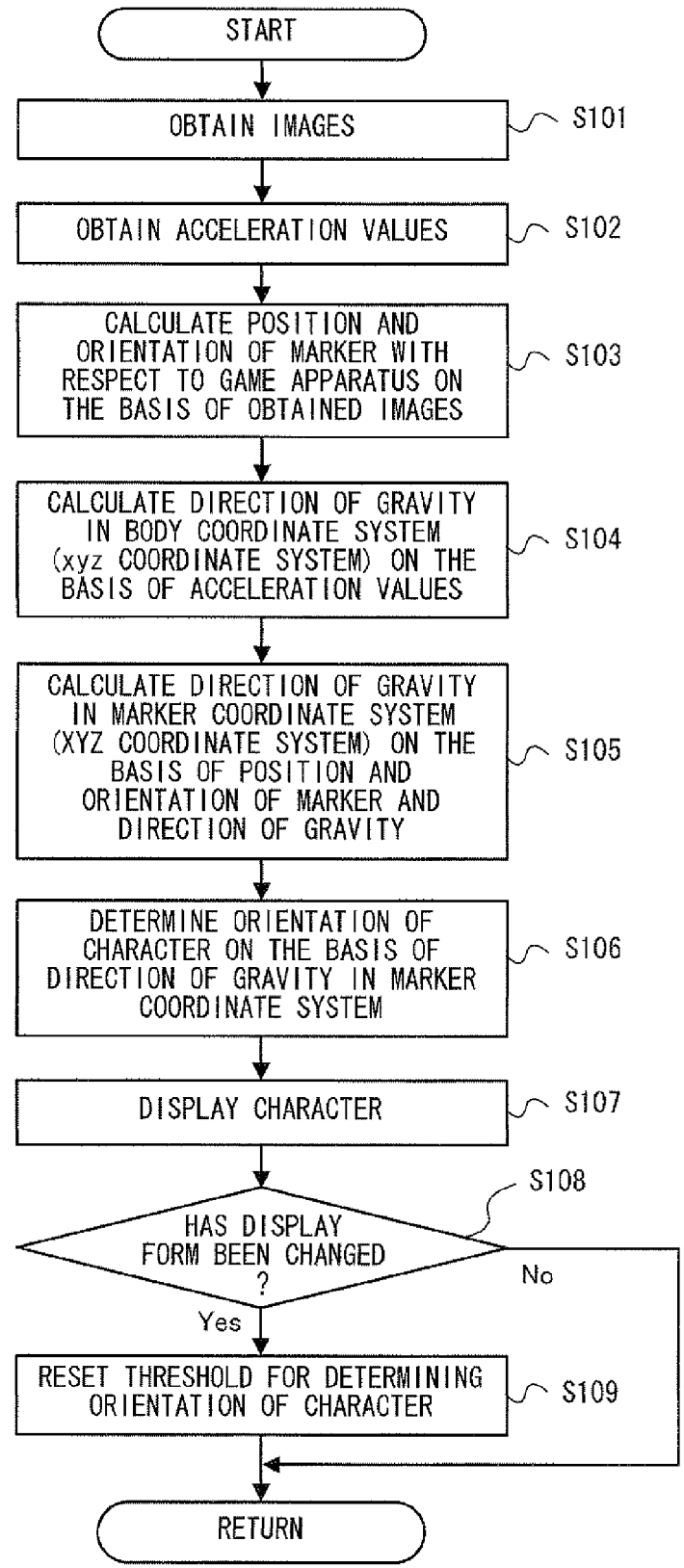
FIG. 11 is a main flowchart illustrating in detail the display process according to the embodiment.

FIG. 11 is a main flowchart illustrating in detail the display process according to the present embodiment. When the game apparatus 10 is powered on, the information processing section 31 (CPU 311) of the game apparatus 10 executes a boot program stored in a ROM, thereby initializing the respective units such as the main memory 32. Next, the game program 70 stored in a nonvolatile memory (such as the external memory 44 or the like that is a computer-readable storage medium) is loaded into the RAM (specifically, the main memory 32), and the CPU 311 of the information processing section 31 starts execution of the program. After the above process is completed, processes shown in the flowchart in FIG. 11 are performed by the information processing section 31 (the CPU 311 or the GPU 312).

It should be noted that in FIG. 11, processes that do not directly relate to the present invention are omitted. In addition, processes at steps S101 to S109 shown in FIG. 11 are repeatedly performed in every single frame (e.g., 1/30 sec or 1/60 sec that is referred to as a frame time).

First, at step S101, the information processing section 31 obtains images taken by the outer imaging section 23. Specifically, the information processing section 31 obtains an image taken by the outer imaging section (left) 23a and stores the image as the real image 71L for a left eye in the RAM, and also obtains an image taken by the outer imaging section (right) 23b and stores the image as the real image 71R for a right eye in the RAM. Next, the information processing section 31 performs a process at step S102.

At step S102, the information processing section 31 refers to the acceleration data 72 stored in the RAM and obtains the value of an acceleration, in each axial direction, which is detected by the acceleration sensor 39. Next, the information processing section 31 performs a process at step S103.

At step S103, the information processing section 31 calculates a position and an orientation of the marker 51 with respect to the game apparatus 10 on the basis of the images obtained at step S101. Specifically, the information processing section 31 detects the marker 51 by performing image processing such as pattern matching on either or both of the real image 71L for a left eye and the real image 71R for a right eye that are obtained at step S101. The information processing section 31 calculates the positional relation between the marker 51 and the game apparatus 10 in the real space on the basis of the shape and the size of the image and the orientation, of the detected marker 51, and sets a marker coordinate system on the marker 51.

Figure 12:
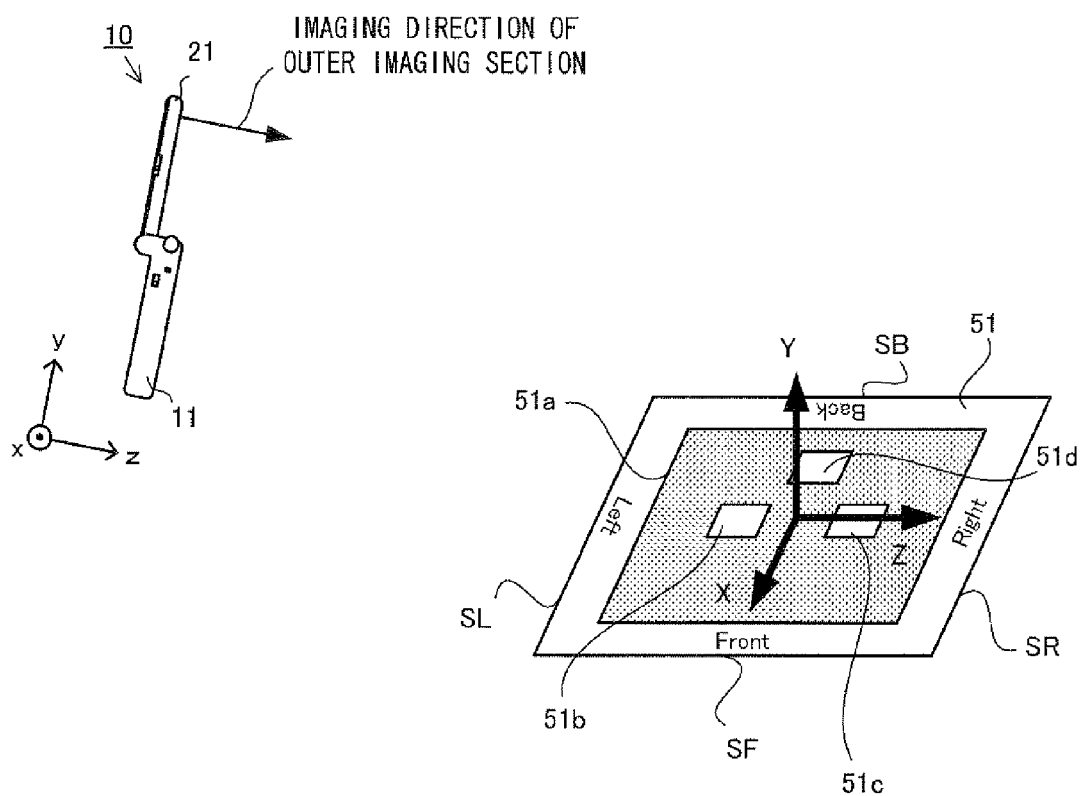
FIG. 12 is a diagram illustrating a marker coordinate system that is set on the marker 51.

FIG. 12 is a diagram illustrating the marker coordinate system that is set on the marker 51. As shown in FIG. 12, the origin of the marker coordinate system (XYZ coordinate system) is set at the center of the marker 51. The X axis of the marker coordinate system is set to have the direction from the center of the marker 51 toward the center of the side SF at which the letters "Front" are written (the direction opposite to the direction from the center of the marker 51 toward the center of the square region 51d). In addition, the Z axis of the marker coordinate system is set to have the direction from the center of the marker 51 toward the center of the side SR at which the letters "Right" are written (the direction from the center of the marker 51 toward the center of the square region 51c). Further, the Y axis of the marker coordinate system is set to have the upward direction perpendicular to the marker 51. In the game apparatus 10, the shape and the size of the marker 51 and the pattern drawn on the region 51a are previously stored. The information processing section 31 sets the marker coordinate system by detecting an image of the marker 51 included in the real image 71L for a left eye and/or the real image 71R for a right eye. The marker coordinate system set thus is a coordinate system fixed to the marker 51, and, for example, when the marker 51 in the real space is rotated about the central axis of the marker 51, the marker coordinate system also rotates similarly.

More specifically, at step S103, the information processing section 31 calculates a matrix indicating the positional relation between the game apparatus 10 and the marker 51. The matrix indicating the positional relation between the game apparatus 10 and the marker Si is a matrix indicating the position and the orientation (rotation) of the marker 51 with respect to the game apparatus 10, or is a matrix indicating the position and the orientation of the game apparatus 10 with respect to the marker 51. As shown in FIG. 12, the matrix indicating the position and the orientation of the marker 51 with respect to the game apparatus 10 is a coordinate transformation matrix for transforming a coordinate represented in a body coordinate system (xyz coordinate system) fixed to the game apparatus 10, into a coordinate represented in the marker coordinate system (XYZ coordinate system). The information processing section 31 can calculate the distance between the marker 51 and the game apparatus 10, the orientation of the marker 51, and the like from the image of the marker 51 included in the obtained image, and can calculate the matrix indicating the position and the orientation of the marker 51 with respect to the game apparatus 10. The information processing section 31 stores the calculated matrix as the marker information 74 in the RAM. After the process at step S103, the information processing section 31 performs a process at step S104. When not detecting the marker 51 from either or both of the real image 71L for a left eye and the real image 71R for a right eye, the information processing section 31 ends the process of the flowchart without performing the subsequent processes (processes at steps S104 to S109).

At step S104, the information processing section 31 calculates a direction of gravity in the body coordinate system (xyz coordinate system) on the basis of the values of the accelerations obtained at step S102. Specifically, the information processing section 31 calculates an acceleration vector G1 (Gx, Gy, Gz) having components that are the value Gx of the acceleration in the x-axial direction, the value Gy of the acceleration in the y-axial direction, and the value Gz of the acceleration in the z-axial direction, which are obtained at step S102. Next, the information processing section 31 performs a process at step S105.

At step S105, the information processing section 31 calculates a direction of gravity in the marker coordinate system on the basis of the position and the orientation of the marker 51 and the calculated direction of gravity. Specifically, the information processing section 31 calculates an acceleration vector G2 (GX, GY, GZ) indicating the direction of gravity in the marker coordinate system, by multiplying the acceleration vector G1 calculated at step S104 by the matrix indicating the position and the orientation of the marker 51 calculated at step S103. Next, the information processing section 31 performs a process at step S106.

At step S106, the information processing section 31 determines the orientation of the virtual character 65 on the basis of the direction of gravity in the marker coordinate system that is calculated at step S105. Specifically, first, the information processing section 31 determines whether the relation between the marker 51 and the ground is parallelism or closer to parallelism than to perpendicularity, or is perpendicularity or closer to perpendicularity than to parallelism, on the basis of the value GY of the Y axis component of the acceleration vector G2 that indicates the direction of gravity in the marker coordinate system and that is calculated at step S105.

Figure 14:
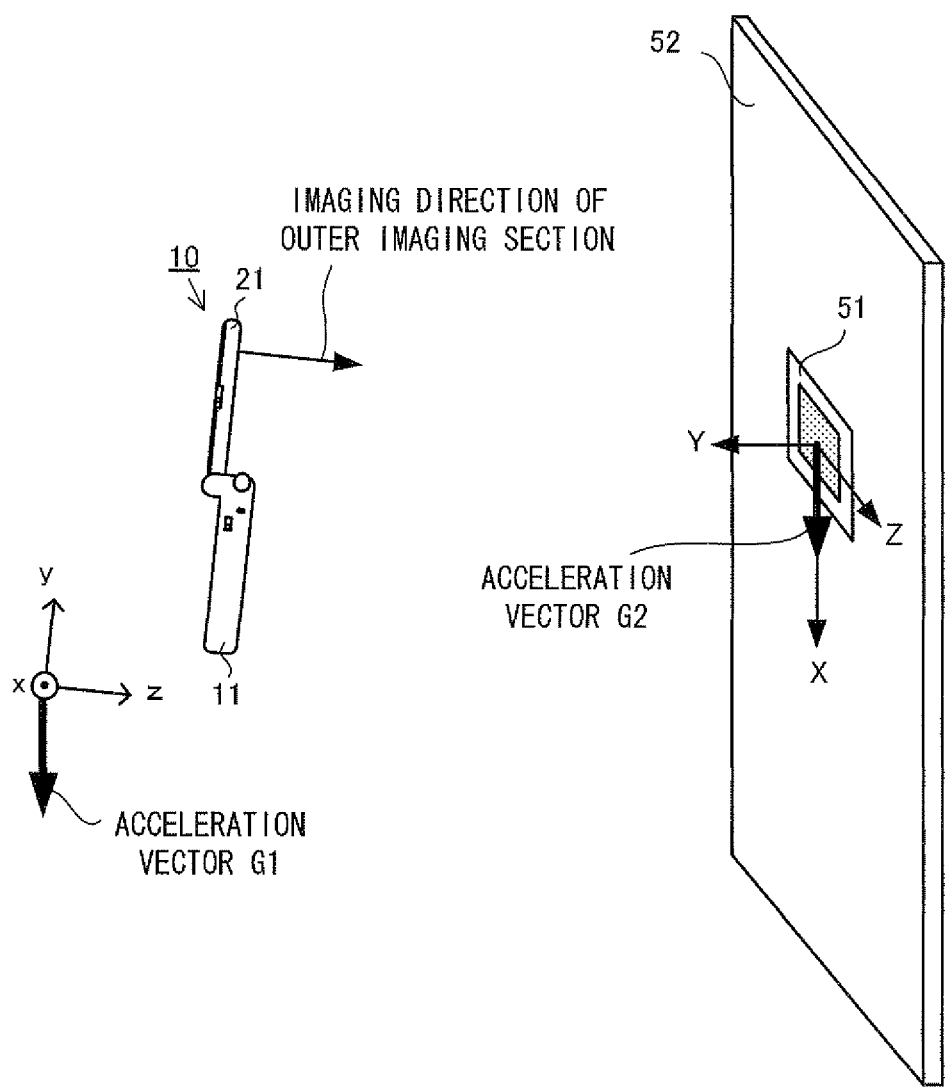
FIG. 14 is a diagram illustrating a situation where an image of the marker 51 attached to the wall 52 perpendicular to the ground is taken by the outer imaging section 23 of the game apparatus 10.

FIG. 13 is a diagram illustrating a situation where an image of the marker 51 placed on the table 50 parallel to the ground is taken by the outer imaging section 23 of the game apparatus 10. FIG. 14 is a diagram illustrating a situation where an image of the marker 51 attached to the wall 52 perpendicular to the ground is taken by the outer imaging section 23 of the game apparatus 10. As shown in FIG. 13, the acceleration vector G1 calculated at step S104 is a vector representing the direction of gravity in the body coordinate system (xyz coordinate system), and the acceleration vector G2 calculated at step S105 is a vector representing the direction of gravity in the marker coordinate system (XYZ coordinate system). When the marker 51 is placed on the table 50 parallel to the ground, the value of the acceleration vector G2 in the Y axis negative direction agrees with the value G of the gravitational acceleration (GY=−G). Meanwhile, when the marker 51 is attached to the wall 52 perpendicular to the ground as shown in FIG. 14, the Y axis value of the acceleration vector G2 is 0 (GY=0).

Therefore, the information processing section 31 determines whether the relation between the marker 51 and the ground is parallelism or close to parallelism, or is perpendicularity or close to perpendicularity, on the basis of the value, concerning the Y axis, of the acceleration vector G2 (the vector indicating the direction of gravity in the marker coordinate system) calculated at step S105. In the present embodiment, the information processing section 31 determines whether the marker 51 is parallel to the ground or close to being parallel to the ground, or is perpendicular to the ground or close to being perpendicular to the ground. For example, when the marker 51 is placed on a surface that is inclined relative to the ground at a predetermined angle, the marker 51 is regarded as being placed on a surface close to being parallel to the ground (the table 50). In addition, for example, when the marker 51 is attached to a surface that is inclined relative to the ground at an angle higher than the predetermined angle, the marker 51 is regarded as being attached to a surface close to being perpendicular to the ground (the wall 52). Specifically, when the absolute value of the Y axis value GY of the acceleration vector G2 is lower than a first threshold (a threshold indicated by the threshold data 76), the information processing section 31 determines that the marker 51 is perpendicular to the ground or close to being perpendicular to the ground. Further, when the absolute value of the Y axis value GY of the acceleration vector G2 is higher than a second threshold (>the first threshold; a threshold indicated by the threshold data 76), the information processing section 31 determines that the marker 51 is parallel to the ground or close to being parallel to the ground. It should be noted that the information processing section 31 can determine whether the marker 51 is placed on the table 50 or the like parallel to the ground or close to being parallel to the ground or is attached to a ceiling or the like parallel to the ground or close to being parallel to the ground, on the basis of whether the Y axis value GY of the acceleration vector G2 is positive or negative. In other words, when the value GY is negative, the information processing section 31 can determine that the marker 51 is placed on the table 50 or the like (the marker 51 is viewed from the above). On the other hand, when the value GY is positive, the information processing section 31 can determine that the marker 51 is attached to the ceiling or the like (the marker 51 is viewed from the below).

Figure 15A:
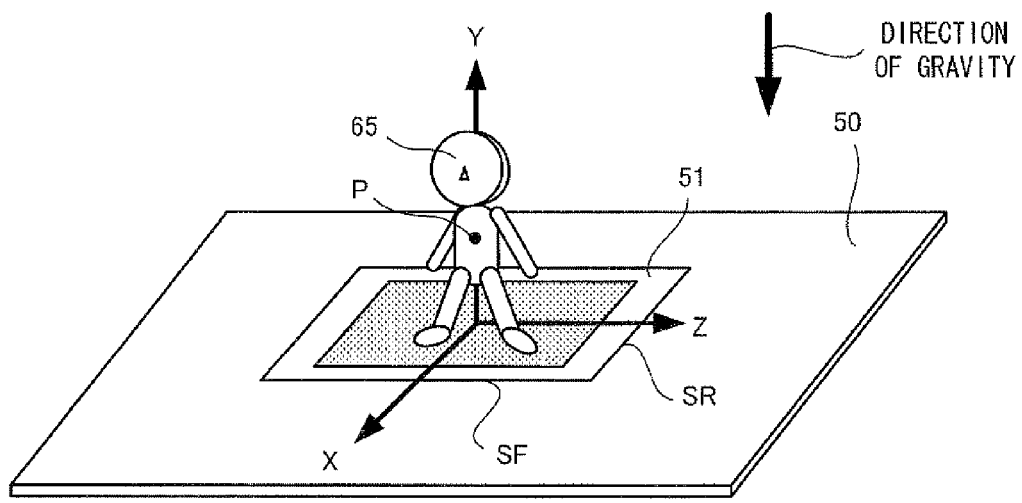
FIG. 15A is a diagram illustrating a position and an orientation of a virtual character 65 when the marker 51 is placed on a surface parallel to the ground (the table 50)

When determining that the marker 51 is parallel to the ground or close to being parallel to the ground, the information processing section 31 determines a position and an orientation of the virtual character 65. FIG. 15A is a diagram illustrating a position and an orientation of the virtual character 65 when the marker 51 is placed on the table 50 parallel to the ground.

As shown in FIG. 15A, the information processing section 31 determines the position P of the virtual character 65 as a predetermined position in the Y axis positive direction of the marker coordinate system. In addition, the information processing section 31 determines the orientation of the virtual character 65 as an orientation A. The orientation A is an orientation in which the virtual character 65 faces in the X axis positive direction and the direction from the head toward the feet of the virtual character 65 agrees with the Y axis negative direction (the direction opposite to the Y axis positive direction). In other words, the orientation A is an orientation that is perpendicular or substantially perpendicular to the marker 51 and in which the virtual character 65 stands on the marker 51. In this manner, the position and the orientation of the virtual character 65 are determined on the basis of each axis of the marker coordinate system. Thus, when images of the marker 51 placed on the surface parallel to the ground are taken by the outer imaging section 23 from different directions as shown in FIGS. 5 and 6, the virtual character 65 can be viewed from different directions.

Figure 15B:
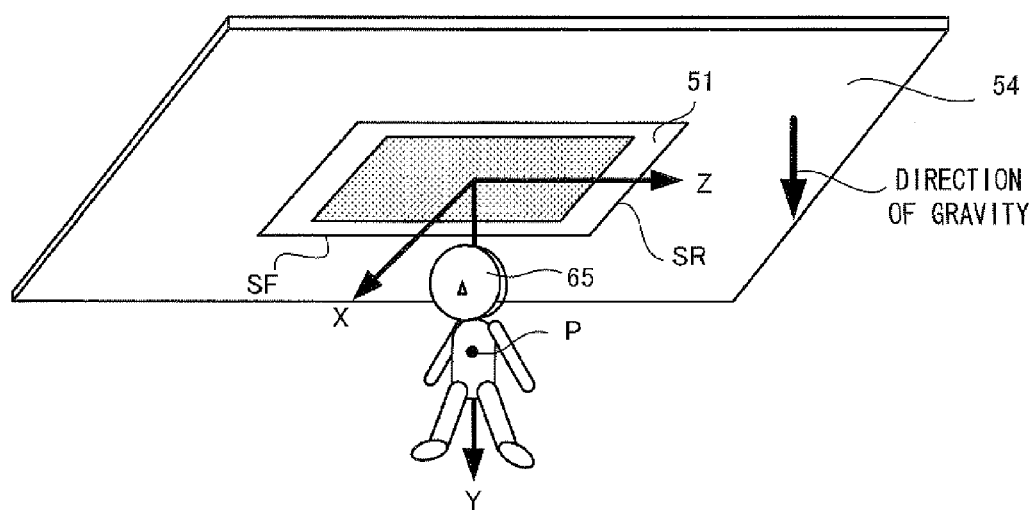
FIG. 15B is a diagram illustrating a position and an orientation of the virtual character 65 when the marker 51 is attached to a ceiling 54 or the like parallel to the ground.

When the marker 51 is attached to a ceiling or the like (the marker 51 is viewed from the below), the information processing section 31 may determine the orientation of the virtual character 65 as the orientation A or as an orientation B different from the orientation A. FIG. 15B is a diagram illustrating a position and an orientation of the virtual character 65 when the marker 51 is attached to a ceiling 54 or the like parallel to the ground. The orientation B is an orientation in which the virtual character 65 faces in the X axis positive direction and the direction from the head toward the feet of the virtual character 65 agrees with the Y axis positive direction. In other words, the orientation B is an orientation that is perpendicular or substantially perpendicular to the marker 51 and in which the marker 51 is located above the head of the virtual character 65.

On the other hand, when determining that the marker 51 is perpendicular to the ground or close to being perpendicular to the ground, the information processing section 31 determines, at step S106, the orientation of the virtual character 65 on the basis of the X axis value GX and the Z axis value GZ of the acceleration vector G2. FIG. 16A is a diagram illustrating an orientation of the virtual character 65 when the marker 51 is attached to a surface perpendicular to the ground such that the side SF of the marker 51, at which the letters "Front" are written, is located on the lower side. FIG. 16B is a diagram illustrating an orientation of the virtual character 65 when the marker 51 is attached to a surface perpendicular to the ground such that the side SR of the marker 51, at which the letters "Right" are written, is located on the lower side. FIG. 16C is a diagram illustrating an orientation of the virtual character 65 when the marker 51 is attached to a surface perpendicular to the ground such that the side SB of the marker 51, at which the letters "Back" are written, is located on the lower side. FIG. 16D is a diagram illustrating an orientation of the virtual character 65 when the marker 51 is attached to a surface perpendicular to the ground such that the side SL of the marker 51, at which the letters "Left" are written, is located on the lower side.

As shown in FIG. 16A, when the marker 51 is attached to a surface perpendicular to the ground (the wall 52) such that the side SF of the marker 51, at which the letters "Front" are written, is located on the lower side, the Y axis of the marker coordinate system is set to have a direction perpendicular to the wall 52. The X axis of the marker coordinate system is set to extend downwardly from the center of the marker 51, and the Z axis of the marker coordinate system is set to extend rightward from the center of the marker 51 (in the direction from the drawing sheet toward the user in FIG. 16A). The X axis value GX of the acceleration vector G2 agrees with the gravitational acceleration G, and the Z axis value GZ of the acceleration vector G2 is 0. In this case, the position P of the virtual character 65 is determined as a predetermined position in the Y axis positive direction of the marker coordinate system. The orientation of the virtual character 65 is determined as an orientation C. The orientation C is an orientation in which the line-of-sight direction of the virtual character 65 agrees with or substantially agrees with the Y axis positive direction of the marker coordinate system and the direction from the head toward the feet of the virtual character 65 agrees with or substantially agrees with X axis positive direction of the marker coordinate system. In this manner, an image in which the virtual character 65 faces the front is generated by taking an image of the virtual character 65, of which the position and the orientation are determined, by the virtual stereo camera 63 (FIG. 17) that is set to have the same position and orientation as those of the outer imaging section 23.

As shown in FIG. 16B, when the marker 51 is attached to a surface perpendicular to the ground (the wall 52) such that the side SR of the marker 51, at which the letters "Right" are written, is located on the lower side, the Z axis of the marker coordinate system is set to extend downwardly from the center of the marker 51. The X axis of the marker coordinate system is set to extend leftward from the center of the marker 51 (in the depth direction of the drawing sheet in FIG. 16B). The Z axis value GZ of the acceleration vector G2 agrees with the gravitational acceleration G, and the X axis value GX of the acceleration vector G2 is 0. In this case, the position P of the virtual character 65 is determined as a predetermined position in the Y axis positive direction of the marker coordinate system. The orientation of the virtual character 65 is determined as an orientation D. The orientation D is an orientation in which the line-of-sight direction of the virtual character 65 agrees with or substantially agrees with the X axis positive direction of the marker coordinate system and the direction from the head toward the feet of the virtual character 65 agrees with or substantially agrees with the Z axis positive direction of the marker coordinate system. In this manner, an image of the virtual character 65 viewed from the right (a taken image of the left side of the virtual character 65) is generated by taking an image of the virtual character 65, of which the position and the orientation are determined, by the virtual stereo camera 63 (FIG. 17) that is set to have the same position and orientation as those of the outer imaging section 23.

As shown in FIG. 16C, when the marker 51 is attached to a surface perpendicular to the ground (the wall 52) such that the side SB of the marker 51, at which the letters "Back" are written, is located on the lower side, the X axis of the marker coordinate system is set to extend upwardly from the center of the marker 51. The Z axis of the marker coordinate system is set to extend leftward from the center of the marker 51 (in the depth direction of the drawing sheet in FIG. 16C). The X axis value GX of the acceleration vector G2 is −G, and the Z axis value GZ of the acceleration vector G2 is 0. In this case, the position P of the virtual character 65 is determined as a predetermined position in the Y axis positive direction of the marker coordinate system. The orientation of the virtual character 65 is determined as an orientation E. The orientation E is an orientation in which the line-of-sight direction of the virtual character 65 agrees with or substantially agrees with the Y axis negative direction of the marker coordinate system and the direction from the head toward the feet of the virtual character 65 agrees with or substantially agrees with the X axis negative direction of the marker coordinate system. In this manner, an image of the virtual character 65 viewed from the back (a taken image of the back of the virtual character 65) is generated by taking an image of the virtual character 65, of which the position and the orientation are determined, by the virtual stereo camera 63 (FIG. 17) that is set to have the same position and orientation as those of the outer imaging section 23.

As shown in FIG. 16D, when the marker 51 is attached to a surface perpendicular to the ground (the wall 52) such that the side SL of the marker 51, at which the letters "Left" are written, is located on the lower side, the Z axis of the marker coordinate system is set to extend upwardly from the center of the marker 51. The X axis of the marker coordinate system is set to extend rightward from the center of the marker 51 (in the direction from the drawing sheet toward the user in FIG. 16D). The Z axis value GZ of the acceleration vector G2 is −G, and the X axis value GX of the acceleration vector G2 is 0. In this case, the position P of the virtual character 65 is determined as a predetermined position in the Y axis positive direction of the marker coordinate system. The orientation of the virtual character 65 is determined as an orientation F. The orientation F is an orientation in which the line-of-sight direction of the virtual character 65 agrees with or substantially agrees with the X axis positive direction of the marker coordinate system and the direction from the head toward the feet of the virtual character 65 agrees with or substantially agrees with the Z axis negative direction of the marker coordinate system. In this manner, an image of the virtual character 65 viewed from the left (a taken image of the right side of the virtual character 65) is generated by taking an image of the virtual character 65, of which the position and the orientation are determined, by the virtual stereo camera 63 (FIG. 17) that is set to have the same position and orientation as those of the outer imaging section 23.

Each of the orientations of the virtual character 65 shown in FIGS. 16A to 16D is determined on the basis of the X axis value GX and the Z axis value GZ of the acceleration vector G2. For example, when the value GX is positive and is higher than a predetermined threshold, the orientation of the virtual character 65 is determined as the orientation C shown in FIG. 16A. For example, when the value GZ is positive and is higher than a predetermined threshold, the orientation of the virtual character 65 is determined as the orientation D shown in FIG. 16B. Each of the thresholds used for the determinations of the orientation is a threshold indicated by the threshold data 76 stored in the RAM and is reset at step S109 described below.

As described above, at step S106, the position and the orientation of the virtual character 65 are determined on the basis of the acceleration vector G2 (the vector representing the direction of gravity in the marker coordinate system) calculated at step S105. The information processing section 31 stores a matrix indicating the determined position and orientation of the virtual character 65, as the character orientation information 73 in the RAM. After step S106, the information processing section 31 subsequently performs a process at step S107.

At step S107, the information processing section 31 displays the virtual character 65 on the upper LCD 22. Specifically, first, the information processing section 31 locates the virtual character 65 in the virtual space (the marker coordinate system) and sets the virtual stereo camera 63 in the virtual space.

FIG. 17 is a diagram illustrating the virtual stereo camera 63 and the virtual character 65 that are set in the virtual space. As shown in FIG. 17, the virtual stereo camera 63 includes the left virtual camera 63*a* and the right virtual camera 63*b*. The position and the orientation of the left virtual camera 63*a* in the marker coordinate system are determined on the basis of the marker information 74 (the information representing the matrix indicating the position and the orientation of the marker 51 with respect to the game apparatus 10). Specifically, the position and the orientation of the left virtual camera 63*a* are set so as to correspond to the position and the orientation of the outer imaging section (left) 23*a* with respect to the marker 51. In other words, the position and the orientation of the left virtual camera 63*a* in the marker coordinate system agree with the position and the orientation of the outer imaging section (left) 23*a* with respect to the marker 51 in the real space. Similarly, the position and the orientation of the right virtual camera 63*b* in the marker coordinate system are determined on the basis of the marker information 74 (the information representing the matrix indicating the position and the orientation of the marker 51 with respect to the game apparatus 10). Specifically, the position and the orientation of the right virtual camera 63*b* are set so as to correspond to the position and the orientation of the outer imaging section (right) 23*b* with respect to the marker 51. In other words, the position and the orientation of the right virtual camera 63*b* in the marker coordinate system agree with the position and the orientation of the outer imaging section (right) 23*b* with respect to the marker 51 in the real space.

It should be noted that the orientations of the left virtual camera 63*a* and the right virtual camera 63*b* do not necessarily need to agree with the orientations of the outer imaging section (left) 23*a* and the outer imaging section (right) 23*b*, respectively. For example, the imaging direction of the outer imaging section (left) 23*a* and the imaging direction of the outer imaging section (right) 23*b* are parallel to each other, but do not necessarily need to be parallel to each other. For example, the left virtual camera 63*a* and the right virtual camera 63*b* may be set to face the inner side. Further, the distance LA between the outer imaging section (left) 23*a* and the outer imaging section (right) 23*b* is fixed, but the distance LB between the left virtual camera 63*a* and the right virtual camera 63*b* may be a fixed value corresponding to the distance LA or may be a variable value. For example, the distance LB between the left virtual camera 63*a* and the right virtual camera 63*b* may be set in accordance with the position of the slider 25*a* of the 3D adjustment switch 25.

The information processing section 31 locates the virtual character 65 in the virtual space. Specifically, the information processing section 31 locates the virtual character 65 in the virtual space in the position and orientation determined at step S106. After setting the virtual stereo camera 63 and the virtual character 65 in the virtual space, the information processing section 31 generates a left virtual character image 75L and a right virtual character image 75R by taking an image of the virtual space including the virtual character 65 by the virtual stereo camera 63, and stores these two images in the RAM. The left virtual character image 75L is an image of the virtual space including the virtual character 65 which image is taken by the left virtual camera 63*a*, and the right virtual character image 75R is an image of the virtual space including the virtual character 65 which image is taken by the right virtual camera 63*b*. Next, the information processing section 31 generates a left superimposed image in which the left virtual character image 75L and the real image 71L for a left eye that is obtained and stored in the RAM at step S101 are superimposed on each other. In addition, the information processing section 31 generates a right superimposed image in which the right virtual character image 75R and the real image 71R for a right eye that is obtained and stored in the RAM at step S101 are superimposed on each other. Then, the information processing section 31 displays the left superimposed image and the right superimposed image on the upper LCD 22. Specifically, the information processing section 31 displays these two images on the upper LCD 22 such that the left superimposed image and the right superimposed image are viewed with the left and right eyes, respectively, of the user through the parallax barrier. Thus, a stereoscopically visible image is displayed on the upper LCD 22.

After step S107, the information processing section 31 subsequently performs a process at step S108.

At step S108, the information processing section 31 determines whether or not the display form has been changed. Here, it is determined whether or not the orientation of the virtual character 65 determined in the process at step S106 in the current frame is different from the orientation of the virtual character 65 determined in the process at step S106 in the last frame. Specifically, the information processing section 31 determines whether or not the orientation of the virtual character 65 indicated by the last character orientation information 77 is different from the orientation of the virtual character 65 indicated by the character orientation information 73. When the orientation of the virtual character 65 determined in the current frame is different from the orientation of the virtual character 65 determined in the last frame, the information processing section 31 determines that the display form has been changed, and subsequently performs a process at step S109. On the other hand, when the display form has not been changed, the information processing section 31 copies the character orientation information 73 as the last character orientation information 77 and ends the process of the flowchart shown in FIG. 11.

At step S109, the information processing section 31 resets the threshold for determining the orientation of the virtual character 65. The process at step S109 is performed in order to prevent the orientation (display form) of the virtual character 65 from frequently being changed when each axial direction value of the acceleration vector G2 varies around the threshold.

Figure 18A:
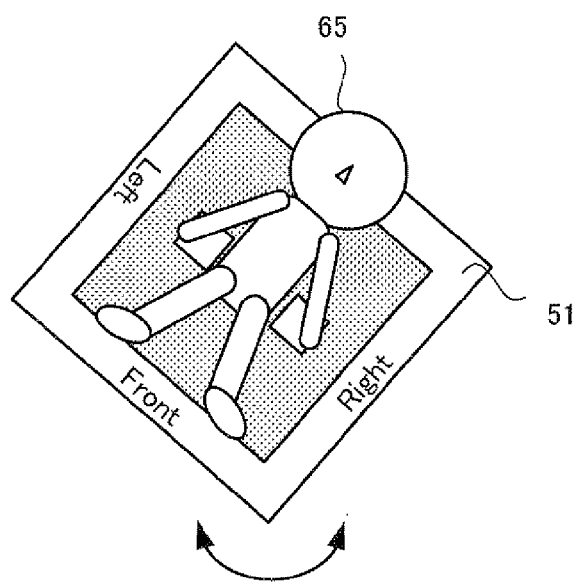
FIG. 18A is a diagram illustrating a situation where the virtual character 65 is set so as to face the front when the marker 51 is attached to the wall 52 in an inclined manner.
Figure 18B:
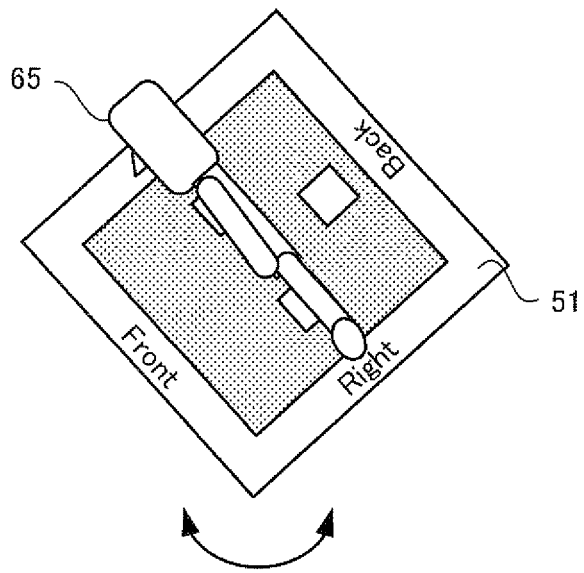
FIG. 18B is a diagram illustrating a situation where the virtual character 65 is set so as to face the left when the marker 51 is attached to the wall 52 in an inclined manner.
Figure 19:
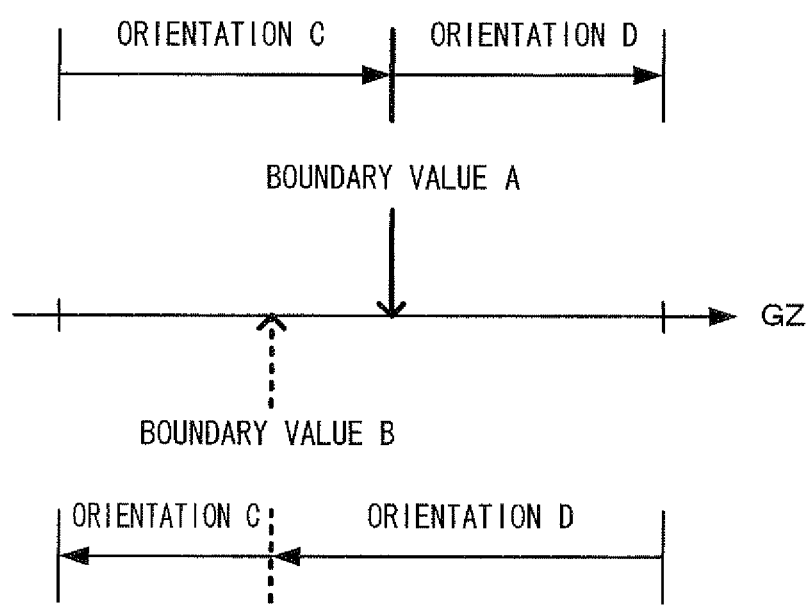
FIG. 19 is a diagram conceptually illustrating a process of resetting a threshold for determining an orientation of the virtual character 65.

FIG. 18A is a diagram illustrating is a diagram illustrating a situation where the virtual character 65 is set so as to face the front when the marker 51 is attached to the wall 52 in an inclined manner. FIG. 18B is a diagram illustrating a situation where the virtual character 65 is set so as to face the left when the marker 51 is attached to the wall 52 in an inclined manner. As shown in FIGS. 18A and 18B, when the marker 51 is rotated about the central axis of the marker 51 by an angle exceeding a predetermined threshold, the orientation of the virtual character 65 is changed from the orientation facing the front (the orientation C) to the orientation facing the left (the orientation D). When the marker 51 is rotated about the central axis of the marker 51 clockwise and counterclockwise by an angle close to the predetermined threshold, the orientation of the virtual character 65 is frequently changed. At step S109, in order to prevent the orientation of the virtual character 65 from being frequently changed as described above, the information processing section 31 resets the threshold for determining the orientation of the virtual character 65. A process of resetting the threshold for determining the orientation of the virtual character 65 will be described with reference to FIG. 19. FIG. 19 is a diagram conceptually illustrating the process of resetting the threshold for determining the orientation of the virtual character 65.

For example, as shown in FIG. 19, when the Z axis value GZ of the acceleration vector G2 is lower than a boundary value A, the orientation of the virtual character 65 is set to the orientation C, and when the value GZ is equal to or higher than the boundary value A, the orientation of the virtual character 65 is set to the orientation D. The boundary value A is a predetermined value that is initially set. When the orientation of the virtual character 65 calculated in the last frame is the orientation C, if the value GZ calculated in the current frame exceeds the boundary value A, the orientation C shifts to the orientation D in the current frame. In this case, in the process at step S109 in the current frame, the information processing section 31 changes the threshold for changing from the orientation D to the orientation C, from the boundary value A to a boundary value B (<the boundary value A). By changing the threshold (the boundary value) for determining the orientation when an orientation shifts to another orientation as described above, even when the marker 51 is rotated clockwise and counterclockwise by an angle close to the threshold, the orientation of the virtual character 65 can be prevented from being frequently changed between two orientations.

After end of the process at step S109, the information processing section 31 copies the character orientation information 73 as the last character orientation information 77 and ends the process of the flowchart shown in FIG. 11.

As described above, in the present embodiment, the marker 51 is detected, the positional relation between the marker 51 and the game apparatus 10 is calculated, and the direction of gravity is calculated on the basis of the values of the accelerations detected by the acceleration sensor 39. Thus, the orientation of the virtual character 65 can be changed on the basis of the calculated positional relation and direction of gravity. In the present embodiment, since the orientation of the virtual character 65 can be changed on the basis of the positional relation between the marker 51 and the game apparatus 10 and the direction of gravity as described above, the virtual character 65 can easily be viewed from various directions.

(Modifications)

In the present embodiment, the orientation of the game apparatus 10 with respect to the direction of gravity is calculated on the basis of the accelerations detected by the acceleration sensor 39. In another embodiment, the orientation of the game apparatus 10 may be calculated on the basis of the angular velocities detected by the angular velocity sensor 46. For example, the game apparatus 10 can calculate its orientation concerning rotation about the direction of gravity by using the angular velocity sensor 46, in addition to its inclination with respect to the direction of gravity, and thus can calculate its absolute orientation in the real space. The game apparatus 10 can calculate an angular velocity about each axis by integrating the angular velocity about each axis (x, y, and z axes), which is detected by the angular velocity sensor 46, over time, and can calculate an orientation change from a basic orientation. The basis orientation is, for example, the orientation of the game apparatus 10 that is placed on a surface parallel to the ground. In this manner, the game apparatus 10 can calculate the orientation of the game apparatus 10 by using values detected by means for detecting the orientation (the acceleration sensor 39 and the angular velocity sensor 46). Then, the game apparatus 10 may determine the orientation of the virtual character 65 on the basis of the calculated orientation and the positional relation between the marker 51 and the outer imaging section 23.

In another embodiment, the orientation of the game apparatus 10 (the outer imaging section 23) in the real space may be calculated by using, for example, a geomagnetic sensor in addition to (or instead of) the acceleration sensor 39 and the angular velocity sensor 46. By calculating the orientation of the game apparatus 10 (the outer imaging section 23) in the real space by using these sensors and further taking an image of the marker 51 by the outer imaging section 23, the orientation of the marker 51 with respect to a predetermined direction (e.g., the direction of gravity, a direction perpendicular to the direction of gravity, an eastward direction, a westward direction, a southward direction, a northward direction, or the like) can be calculated. Then, the orientation of the virtual character 65 can be determined in accordance with the orientation of the marker 51 with respect to the predetermined direction.

In the present embodiment, the orientation of the virtual character 65 is determined on the basis of from which of six directions (upward, downward, frontward, rearward, leftward, and rightward) an image of the marker 51 is taken. The six directions include a direction in which an image of the marker 51 placed on the table 50 or the like is taken from the above, a direction in which an image of the marker 51 attached to the ceiling 54 or the like is taken from the below, and directions in which images of the marker 51 attached to the wall 52 or the like such that the sides of the front, back, left, and right are located on the lower side are taken. In another embodiment, the image taking directions are not limited to the six directions. For example, when an image of the marker 51 placed on a surface inclined with respect to the ground is taken, the virtual character 65 having an orientation different from the above orientations may be displayed.

In the present embodiment, the orientation of the virtual character 65 is determined on the basis of the orientation of the game apparatus 10 and the positional relation between the marker 51 and the outer imaging section 23. In another embodiment, the display form of the virtual object may be determined. The display form of the virtual object may be, for example, a position, an attitude (an orientation concerning in which direction the virtual object faces as in the embodiment described above, a pose in which a hand is raised or the virtual object sits), a facial expression, and a motion pattern, of the virtual object, an item possessed by the virtual object, the stereoscopic effect of the virtual object (a stereoscopic effect provided by a disparity), the color and the brightness of the virtual object, or the like. Further, in another embodiment, a virtual object displayed on the display device is not limited to the virtual character located in the virtual space, and may be, for example, a letter, a predetermined image, or the like.

In another embodiment, the type and number of objects to be displayed may be determined on the basis of the orientation of the game apparatus 10 and the positional relation between the marker 51 and the outer imaging section 23. For example, a plurality of types of virtual objects (the virtual character described above and any other virtual objects) may previously be prepared in the game apparatus 10, and it may be determined which virtual object among the plurality of types of virtual objects is to be displayed, on the basis of the orientation of the game apparatus 10 and the positional relation between the marker 51 an the outer imaging section 23.

In the present embodiment, the flat square marker 51 is used. In another embodiment, any marker may be used, and a marker (specific object) having a three-dimensional shape may be used. For example, a marker having a predetermined pattern drawn on a predetermined surface of a cube may be used. In this case, for example, the display form and the like of the virtual object may be different between the case where the cube is placed on the table 50 or the like such that the predetermined surface of the cube is perpendicular to the direction of gravity and the case where the cube is placed on the table 50 or the like such that the predetermined surface of the cube is parallel to the direction of gravity.

In the present embodiment, the acceleration sensor 39 is accommodated in the lower housing 11, and the accelerations detected by the acceleration sensor 39 are used as the information indicating the orientation of the outer imaging section 23. In this case, on the assumption that the upper housing 21 is rotated by 180 degrees to be in an opened state (a state where the inner surface of the lower housing 11 is parallel to the inner surface of the upper housing 21 as shown in FIG. 1), the orientation of the outer imaging section 23 is calculated. In another embodiment, a sensor for detecting a rotation angle of the upper housing 21 may be provided at a hinge portion that allows the lower housing 11 and the upper housing 21 to be rotated. Then, the orientation (the orientation with respect to the direction of gravity) of the outer imaging section 23 may be calculated by using a result of the detection of the acceleration sensor 39 accommodated in the lower housing 11 and a result of the detection of the sensor for detecting the rotation angle.

In another embodiment, the virtual object may not be displayed on the display device for displaying a stereoscopic image, and may be displayed on a display device for displaying a planar image.

In the present embodiment, augmented reality is achieved by using a video see-through technique. In other words, in the aforementioned embodiment, a superimposed image is generated by superimposing an image taken by the virtual camera (the left and right virtual cameras) on an image taken by the outer imaging section 23, and is displayed on the upper LCD 22. In another embodiment, augmented reality is achieved by using an optical see-through technique. For example, the user wears a head mounted display equipped with a camera for detecting a marker provided in the real space, and can view the real space through a display part corresponding to a lens part of a pair of glasses. The display part is formed from a material which allows the user to view the real space therethrough. In addition, the display part is configured such that an image of a virtual object generated by a computer can be displayed thereon.

In the present embodiment, an image taken by the virtual camera is superimposed on a real image taken by a real camera (the outer imaging section 23) to generate an image, and the generated image is displayed on the display device. In another embodiment, the real image may not be displayed on the display device.

In the present embodiment, the display control process described above is performed by using an apparatus in which a real camera (the outer imaging section 23), orientation detection means (the acceleration sensor 39 and the angular velocity sensor 46), and a display device (the upper LCD 22) are integrated with each other. In another embodiment, these components may be formed as separate devices and may be connected to each other. In this case, the marker 51 in an image taken by the real camera is detected, and the positional relation between the real camera and the marker 51 is calculated. The orientation detection means detects the orientation of the real camera. Then, the display form of a virtual object, a type of a virtual object to be displayed, and the like are determined on the basis of the calculated positional relation and the orientation of the real camera detected by the orientation detection means.

In another embodiment, other than the hand-held game apparatus, the display control method described above may be applied to stationary game apparatuses and any other electronic apparatuses such as PDAs (personal digital assistants), highly-functional mobile phones, and personal computers.

In the present embodiment, the LCD capable of displaying a stereoscopically visible image that can be viewed with naked eyes is used as a display device. In another embodiment, the present invention is also applicable to methods in which a stereoscopically visible image is displayed by using glasses, such as time sharing method, polarization method, and anaglyph method (red cyan glasses method), and methods using a head-mounted display, and the like.

In another embodiment, a plurality of information processing apparatuses communicably connected to each other via a wired or wireless line are constructed as a display control system which implements the display control method described above, by dividing each process to be performed by the plurality of information processing apparatuses. For example, a terminal connected to an imaging apparatus and a display device accesses a server on the Internet, and the server may performs at least some of the processes described above.

Further, in the embodiment described above, the aforementioned processes in the flowcharts are performed by the information processing section 31 of the game apparatus 10 executing a predetermined program. In another embodiment, a part or all of the aforementioned processes may be performed by a dedicated circuit provided in the game apparatus 10.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an information processing program executable by a computer of an information processing apparatus, the program, when executed, causing the computer to perform operations comprising:
    obtaining a taken image that is taken by a camera of an imaging apparatus;
    obtaining orientation information from a sensor included in the imaging apparatus, the orientation information indicating an orientation of the camera;
    detecting a specific object from the taken image;
    calculating a relative positional relation between the specific object and the camera;
    determining virtual object information including a virtual object display form, a virtual object type, and/or a number of virtual objects, based on the orientation information;
    generating an image of one or more virtual objects corresponding to the virtual object information based on the calculated positional relation between the specific object and the camera; and
    displaying the image of the one or more virtual objects on a display device.

2. The non-transitory computer-readable storage medium according to claim 1, wherein the virtual object display form is determined on the basis of at least the orientation information.

3. The non-transitory computer-readable storage medium according to claim 1, wherein the virtual object display form, the virtual object type, and/or the number of virtual objects, is determined on the basis of the positional relation and the orientation information.

4. The non-transitory computer-readable storage medium according to claim 3, wherein the virtual object display form is determined in accordance with an orientation of the specific object with respect to a predetermined direction indicated by the orientation information.

5. The non-transitory computer-readable storage medium according to claim 4, wherein
    the obtained orientation information comprises orientation information indicating a predetermined direction in a coordinate system based on the camera, and
    a predetermined direction in a coordinate system is calculated based on the specific object on the basis of the positional relation and the obtained orientation information, and the virtual object display form is determined on the basis of the calculated predetermined direction.

6. The non-transitory computer-readable storage medium according to claim 5, wherein
    at least when the calculated predetermined direction indicates that the specific object is located in a real space so as to be perpendicular to the predetermined direction indicated by the orientation information, the virtual object display form is determined as a first display form, and
    at least when the calculated predetermined direction indicates that the specific object is located in the real space so as to be parallel to the predetermined direction indicated by the orientation information, the virtual object display form is determined as a second display form.

7. The non-transitory computer-readable storage medium according to claim 4, wherein an orientation of the virtual object with respect to the specific object is determined in accordance with the orientation of the specific object with respect to the predetermined direction indicated by the orientation information.

8. The non-transitory computer-readable storage medium according to claim 7, wherein
    at least when the specific object is located in a real space so as to be perpendicular to the predetermined direction indicated by the orientation information, the orientation of the virtual object is determined such that the virtual object has an orientation perpendicular to the specific object, and
    at least when the specific object is located in the real space so as to be parallel to the predetermined direction indicated by the orientation information, the orientation of the virtual object is determined such that the virtual object has an orientation parallel to the specific object.

9. The non-transitory computer-readable storage medium according to claim 8, wherein at least when the specific object is located in the real space so as to be parallel to the predetermined direction indicated by the orientation information, the orientation of the virtual object is determined as a first orientation if a rotation angle of at least a surface of the specific object about an axis perpendicular to the surface is a first angle, and the orientation of the virtual object is determined as a second orientation if the rotation angle is a second angle.

10. The non-transitory computer-readable storage medium according to claim 4, wherein the predetermined direction is a direction of gravity.

11. The non-transitory computer-readable storage medium according to claim 5, wherein
    when the predetermined direction in the coordinate system based on the specific object is in a first range, the virtual object display form is determined as a first form,
    when the predetermined direction in the coordinate system based on the specific object is in a second range that is separated from the first range by a predetermined boundary, the virtual object display form is determined as a second form, and
    when the display form of the virtual object is changed from the first form to the second form, the predetermined boundary is set on the first range side as compared to that when the virtual object display form is changed from the second form to the first form.

12. The non-transitory computer-readable storage medium according to claim 1, wherein the image of the one or more virtual objects is displayed on the display device such that the image is superimposed on the taken image that is taken by the camera or a real space that is viewed through a screen of the display device.

13. The non-transitory computer-readable storage medium according to claim 9, wherein
first information indicating the first orientation and second information indicating the second orientation are provided on the specific object,
the first information is visible from an appropriate direction when the specific object is viewed from a first direction, and
the second information is visible from an appropriate direction when the specific object is viewed from a second direction.

14. The non-transitory computer-readable storage medium according to claim 1, wherein
the sensor is an orientation sensor configured to detect the orientation of the camera.

15. An information processing apparatus comprising:
a camera configured to capture a taken image;
a sensor configured to obtain orientation information indicating an orientation of the camera; and
at least one processor being configured to:
detect a specific object from the taken image captured by the camera;
calculate a relative positional relation between the specific object and the camera;
determine virtual object information including a virtual object display form, a virtual object type, and/or a number of virtual objects, based on the orientation information;
generate an image of one or more virtual objects corresponding to the virtual object information based on the calculated positional relation between the specific object and the camera; and
display the image of the one or more virtual objects on a display device.

16. An information processing system comprising:
a camera configured to capture a taken image;
a sensor configured to obtain orientation information indicating an orientation of the camera; and
at least one processor being configured to:
detect a specific object from the taken image obtained by the camera;
calculate a relative positional relation between the specific object and the camera;
determine virtual object information including a virtual object display form, a virtual object type, and/or a number of virtual objects, based on the orientation information;
generate an image of one or more virtual objects corresponding to the virtual object information based on the calculated positional relation between the specific object and the camera; and
display the image of the one or more virtual objects on a display device.

17. An information processing method comprising:
obtaining a taken image that is taken by a camera of an imaging apparatus;
obtaining orientation information from a sensor in the imaging apparatus, the orientation information indicating an orientation of the camera;
detecting a specific object from the taken image;
calculating a relative positional relation between the specific object and the camera;
determining virtual object information including a virtual object display form, a virtual object type, and/or a number of virtual objects, based on at least the orientation information;
generating an image of one or more virtual objects corresponding to the virtual object information based on the calculated positional relation; and
displaying the image of the one or more virtual objects on a display device.

18. An information processing system comprising an information processing apparatus and a marker,
the information processing apparatus comprising:
a camera;
a sensor configured to detect an orientation of the camera; and
at least one processor coupled to the camera and the sensor, the at least one processor being configured to:
take an image of the marker using the camera;
obtain the taken image;
obtain orientation information indicating an orientation of the camera from the sensor;
detect the marker from the taken image;
calculate a relative positional relation between the marker and the camera;
determine virtual object information including a virtual object display form, a virtual object type, and/or a number of virtual objects, based on at least the orientation information;
generate an image of one or more virtual objects corresponding to the virtual object information based on the calculated positional relation; and
display the image of the one or more virtual objects on a display device.

19. The non-transitory computer-readable storage medium according to claim 1, wherein the sensor is an acceleration sensor.

20. The non-transitory computer-readable storage medium according to claim 1, wherein the program, when executed, further causes the computer to rotate the displayed virtual object in accordance with a rotation of the camera about a central axis in the real space.

21. An information processing apparatus comprising:
a camera for capturing an image;
a gravity sensor commonly housed with the camera;
a display; and
processing circuitry coupled to the camera, the gravity sensor and the display, the processing circuitry detecting a marker from the image captured by the camera, calculating a relative positional relationship between the marker and the camera, determining virtual object information including a virtual object display form, a virtual object type, and/or a number of virtual objects, based on at least a direction of gravity determined in accordance with an output of the gravity sensor, generating one or more virtual objects based on the virtual object information and in accordance with the calculated positional relationship between the marker and the camera, and controlling the display to display the one or more virtual objects.

22. The information processing apparatus according to claim 21, wherein the camera is a stereo camera and the image is a stereo image.

23. The information processing apparatus according to claim 21, wherein the gravity sensor comprises an accelerometer.

* * * * *